US007890212B2

(12) United States Patent
Cornett et al.

(10) Patent No.: US 7,890,212 B2
(45) Date of Patent: Feb. 15, 2011

(54) WIZARD FOR PROGRAMMING AN INTELLIGENT MODULE

(75) Inventors: James Cornett, Bluff City, TN (US); Galen Freemon, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 365 days.

(21) Appl. No.: 10/453,438

(22) Filed: Jun. 3, 2003

(65) Prior Publication Data
US 2004/0083456 A1    Apr. 29, 2004

Related U.S. Application Data

(60) Provisional application No. 60/384,979, filed on Jun. 3, 2002.

(51) Int. Cl.
G05B 15/00     (2006.01)
G05B 19/18     (2006.01)
G06F 13/368    (2006.01)

(52) U.S. Cl. ................ 700/264; 700/257; 710/121

(58) Field of Classification Search ............ 700/18, 700/86–88, 23, 181, 246; 717/101, 120, 717/121, 124; 706/10–13, 46, 61
See application file for complete search history.

(56) References Cited

U.S. PATENT DOCUMENTS

| 3,575,077 | A | * | 4/1971 | Herdeg et al. ............ 83/524 |
| 3,941,987 | A | * | 3/1976 | Tack, Jr. .................. 700/188 |
| 3,949,286 | A | * | 4/1976 | Appelgren ............... 318/571 |
| 4,038,640 | A | * | 7/1977 | Lee et al. ................. 341/29 |
| 4,156,170 | A |   | 5/1979 | Strunc |
| 4,670,714 | A | * | 6/1987 | Sievers et al. ............ 324/133 |
| 4,714,867 | A |   | 12/1987 | Palmin et al. |
| 5,059,881 | A | * | 10/1991 | Fujita et al. .............. 318/630 |
| 5,222,028 | A |   | 6/1993 | LaBarre |
| 5,249,739 | A | * | 10/1993 | Bartels et al. ........... 236/15 BR |
| 5,325,522 | A | * | 6/1994 | Vaughn ................... 707/1 |
| 5,508,596 | A |   | 4/1996 | Olsen |
| 5,670,855 | A |   | 9/1997 | Okunishi |
| 5,724,786 | A |   | 3/1998 | Singh |

(Continued)

OTHER PUBLICATIONS

"LabView:Data Acquisition Basics Manual"; National Instruments; Jan. 1998; pp. v-I-22; http://claymore.engineer.gvsu.edu/eod/courses/egr450/media/320997c.pdf.*

(Continued)

*Primary Examiner*—Albert Decady
*Assistant Examiner*—Jennifer L Norton
(74) *Attorney, Agent, or Firm*—Jose R. de la Rosa

(57) ABSTRACT

Certain exemplary embodiments comprise a wizard, which enables a user to configure and program an intelligent module by answering a series of questions about a specific application. The output of the wizard includes two distinct components. The wizard generates a parameter configuration for an intelligent module, reflecting the choices specified by a user for a specific application. The wizard also generates a set of customized instructions for use in a program. These instructions are specific to the choices that the user input into the wizard, and can be used in the same manner as standard instructions. Certain exemplary embodiments of the application, program, and instructions apply to a Program Logic Controller (PLC).

33 Claims, 28 Drawing Sheets

U.S. PATENT DOCUMENTS

| | | | |
|---|---|---|---|
| 5,890,187 A | 3/1999 | Asghar | |
| 5,940,294 A * | 8/1999 | Dove | 700/83 |
| 6,028,412 A | 2/2000 | Shine | |
| 6,034,560 A | 3/2000 | Weber | |
| 6,046,567 A | 4/2000 | Hayes | |
| 6,047,894 A | 4/2000 | Arends | |
| 6,053,951 A * | 4/2000 | McDonald et al. | 717/109 |
| 6,061,603 A * | 5/2000 | Papadopoulos et al. | 700/83 |
| 6,098,116 A * | 8/2000 | Nixon et al. | 710/8 |
| 6,112,119 A | 8/2000 | Schuelke | |
| 6,122,565 A * | 9/2000 | Wenning et al. | 700/206 |
| 6,140,793 A | 10/2000 | Carr | |
| 6,160,365 A * | 12/2000 | Younger et al. | 318/16 |
| 6,208,107 B1 | 3/2001 | Maske | |
| 6,275,741 B1 * | 8/2001 | Choi | 700/200 |
| 6,285,155 B1 | 9/2001 | Maske | |
| 6,320,812 B1 | 11/2001 | Cook | |
| 6,335,769 B1 | 1/2002 | Misaku | |
| 6,343,741 B1 | 2/2002 | Arends | |
| 6,414,460 B1 | 7/2002 | Li | |
| 6,434,516 B1 | 8/2002 | Topmiller | |
| 6,435,716 B1 | 8/2002 | Polkus | |
| 6,442,739 B1 | 8/2002 | Palermo | |
| 6,446,202 B1 * | 9/2002 | Krivoshein et al. | 713/1 |
| 6,574,626 B1 | 6/2003 | Regelman | |
| 6,589,791 B1 | 7/2003 | LaBudde | |
| 6,647,081 B2 * | 11/2003 | Butler et al. | 375/376 |
| 6,653,810 B2 | 11/2003 | Lo | |
| 6,717,513 B1 * | 4/2004 | Sandelman et al. | 340/506 |
| 6,738,659 B2 | 5/2004 | Hsu | |
| 6,763,282 B2 | 7/2004 | Glenn | |
| 6,791,572 B1 * | 9/2004 | Cloney et al. | 345/619 |
| 6,823,221 B2 | 11/2004 | Peck | |
| 6,842,454 B2 * | 1/2005 | Metcalf, III | 370/392 |
| 6,853,867 B1 * | 2/2005 | Klindt et al. | 700/83 |
| 6,888,537 B2 * | 5/2005 | Benson et al. | 345/173 |
| 6,970,948 B2 * | 11/2005 | Brown et al. | 710/8 |
| 6,983,636 B2 | 1/2006 | Johnson | |
| 7,010,362 B2 * | 3/2006 | Dove et al. | 700/18 |
| 7,076,322 B2 * | 7/2006 | Chandhoke | 700/181 |
| 7,565,660 B2 * | 7/2009 | Martin | 719/310 |
| 2002/0129333 A1 * | 9/2002 | Chandhoke et al. | 717/107 |
| 2003/0005375 A1 | 1/2003 | Krech | |
| 2003/0028266 A1 | 2/2003 | Jacques | |
| 2004/0095910 A1 * | 5/2004 | Metts et al. | 370/338 |
| 2004/0165544 A1 * | 8/2004 | Cornett et al. | 370/254 |
| 2005/0132064 A1 * | 6/2005 | Lo | 709/227 |
| 2005/0183421 A1 * | 8/2005 | Vaynberg et al. | 60/641.8 |
| 2007/0179644 A1 * | 8/2007 | Ravish et al. | 700/83 |
| 2009/0005884 A1 * | 1/2009 | Ikegami et al. | 700/18 |

OTHER PUBLICATIONS

"SERVOSTAR: Setup and Reference Guide"; Kollmorgen; Jan. 16, 2001; pp. 1-104; http://www.naic.edu/~phil/mbeam/motor/motcontrol.pdf.*

"Servostar SC Installation Manual Online"—Jan. 9, 2001—XP002318355, retrieved from the Internet, pp. 1-148.

"Servostar MC Features Online"—Dec. 27, 2001—XP002318356, retrieved from the Internet, pp. 1-4.

PCT International Search Report—mailed Mar. 9, 2005.

Khanniche, "An Algorithm for Generating Optimised PWM for Real Time Micro Control Applications", Jul. 13, 1988, pp. 386-389, Third International Conference on Power Electronics and Variable-Speed Drives.

Kolar, "Analysis of on- and off-line Optimized Predictive Current Controllers for PWM Converter Systems", Jul. 3, 1991, pp. 451-462, IEEE Transactions on Power Electronics, vol. 6, Issue 3.

Kollmorgen, "SERVOSTAR MC Features", accessed Feb. 21, 2005, 4 page(s), http://motionvillage.com/products.

Kollmorgen, "SERVOSTAR SC Installation Manual", Jan. 9, 2001, Kollmorgen.

Mirkazemi-Moud, "Single Chip Pulse-Width Modulator Based on a Compressed Look-up Table", Nov. 9, 1992, pp. 246-251, Proceedings of the 1992 International Conference on Power Electronics and Motion Control.

Rahman, "Position Estimation in Solenoid Actuators", May 1, 1996, pp. 552-559, IEEE Transactions on Industry Applications, vol. 32, Issue 3.

* cited by examiner

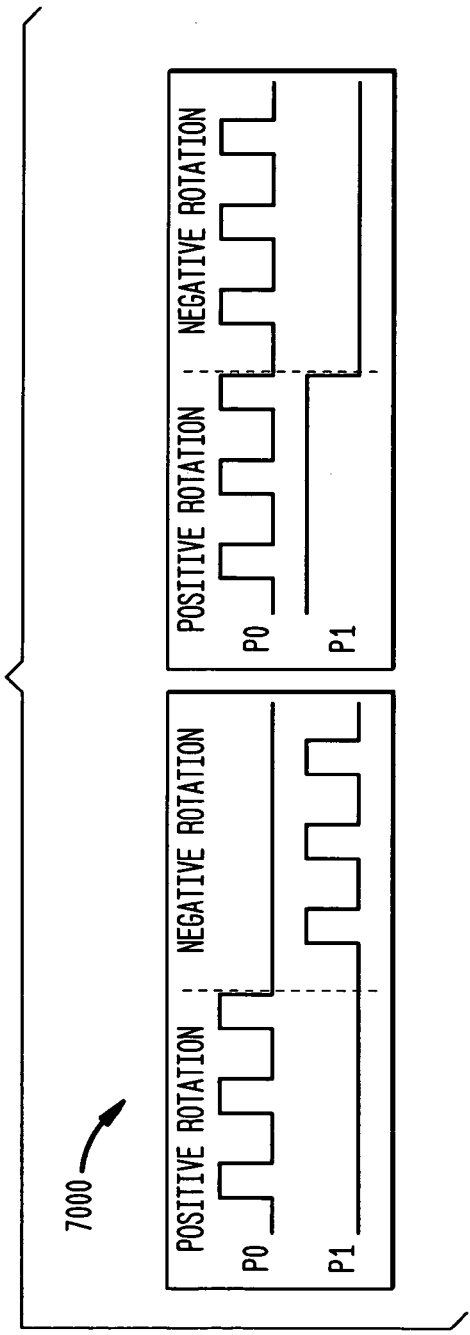
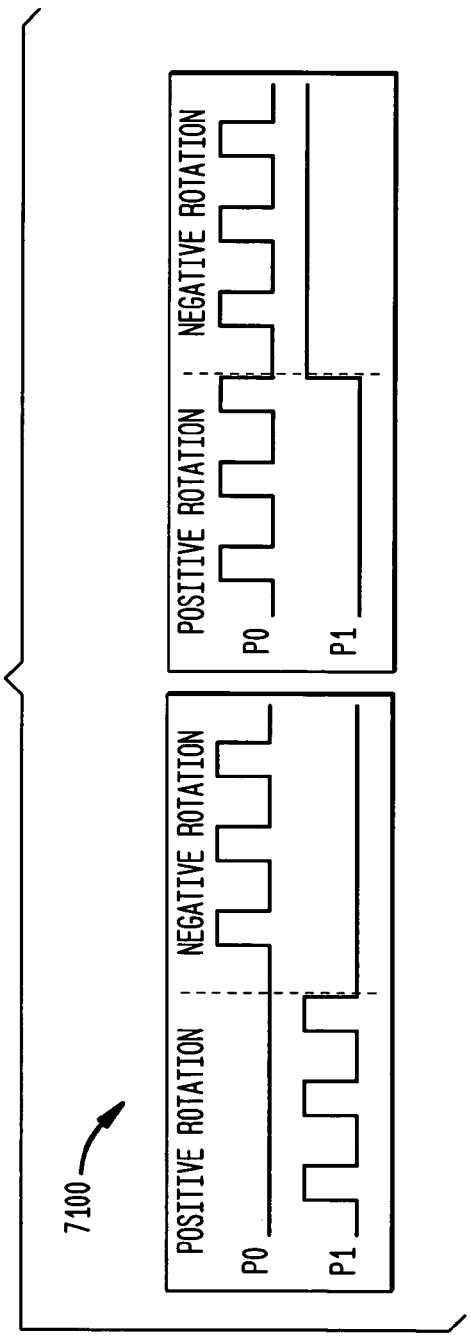

FIG. 22
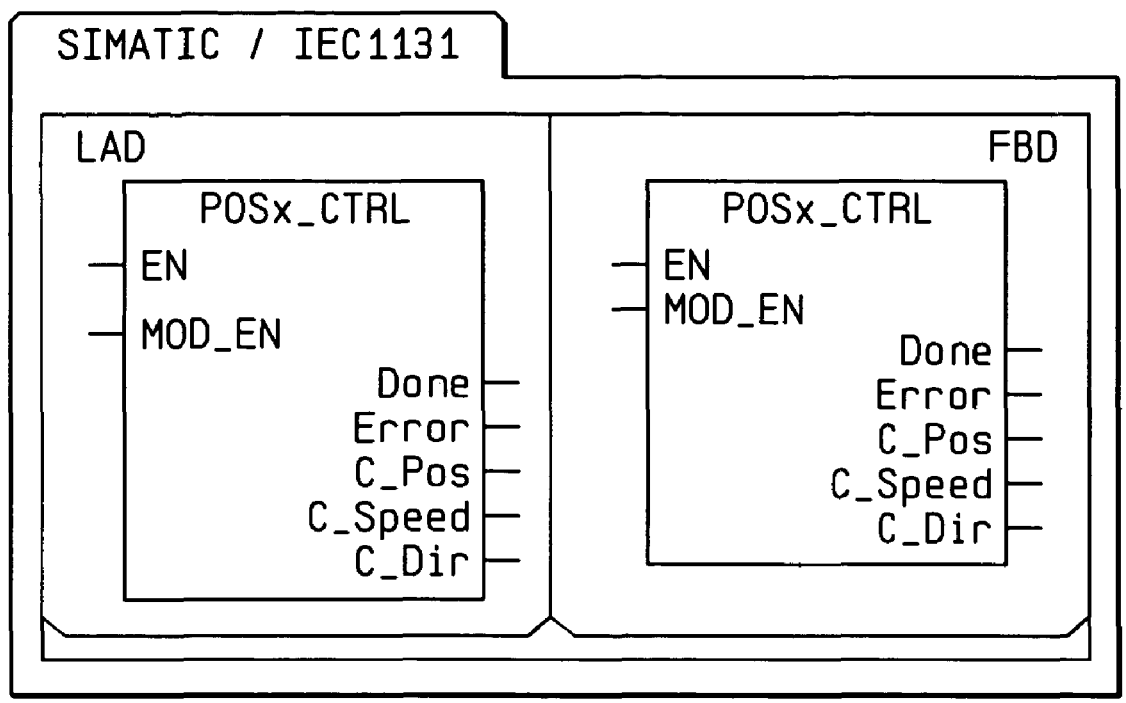
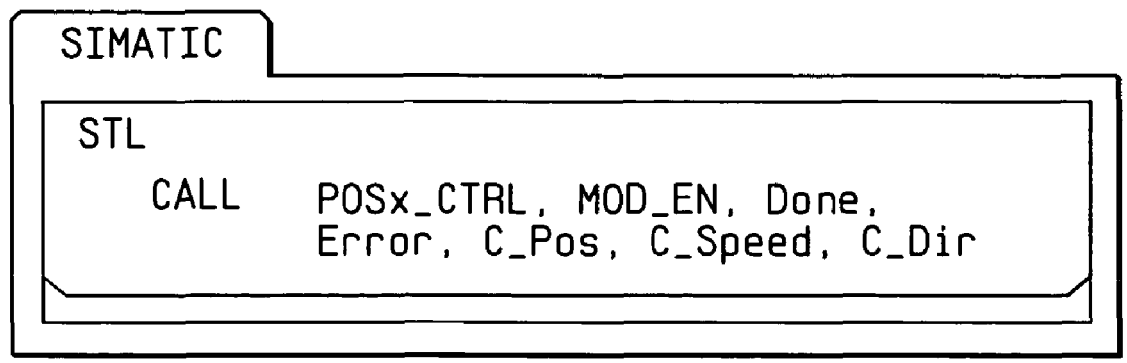

FIG. 23
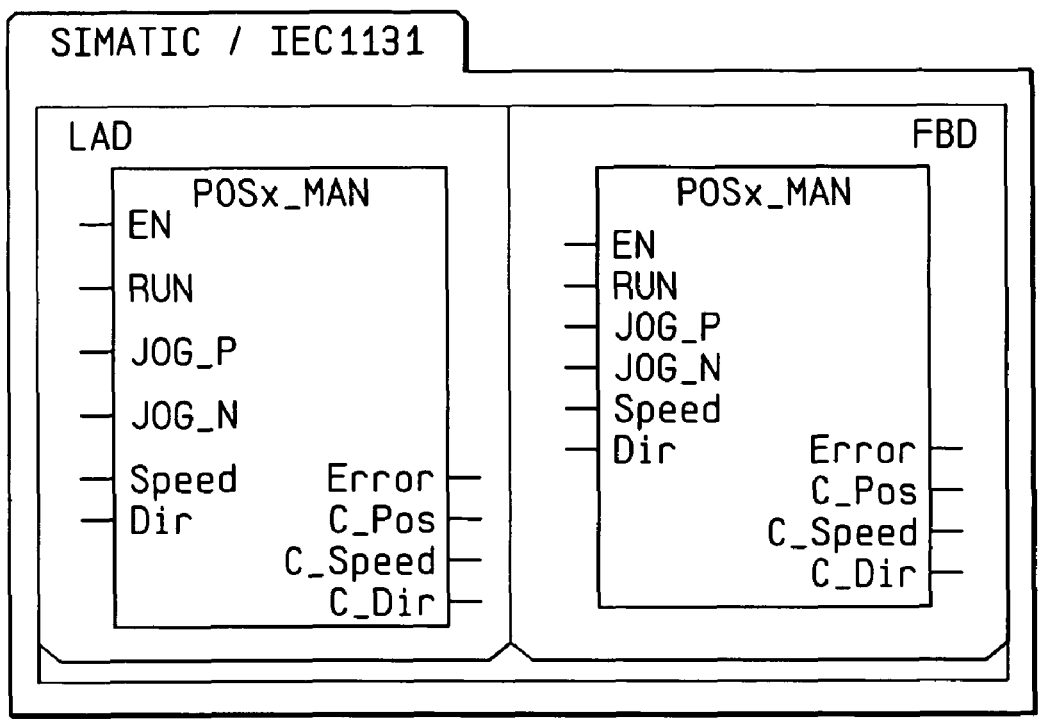
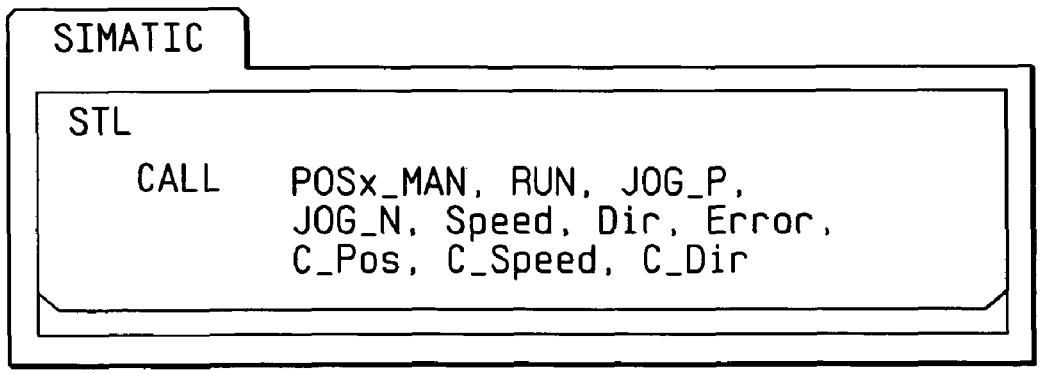

FIG. 24
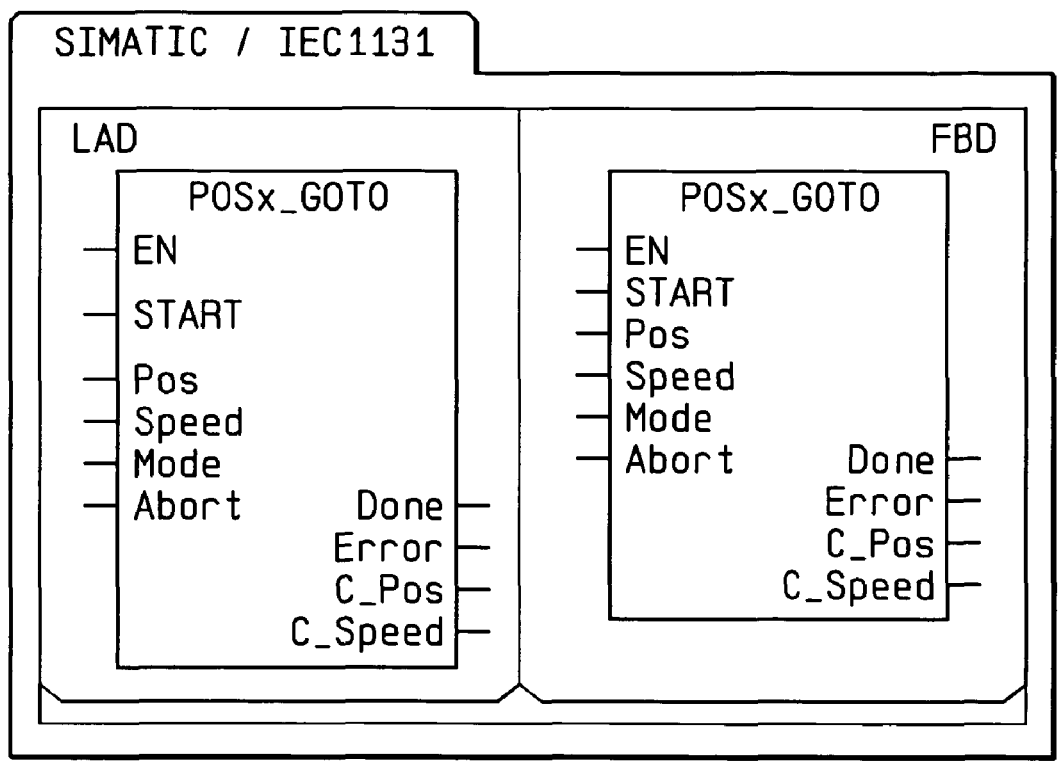
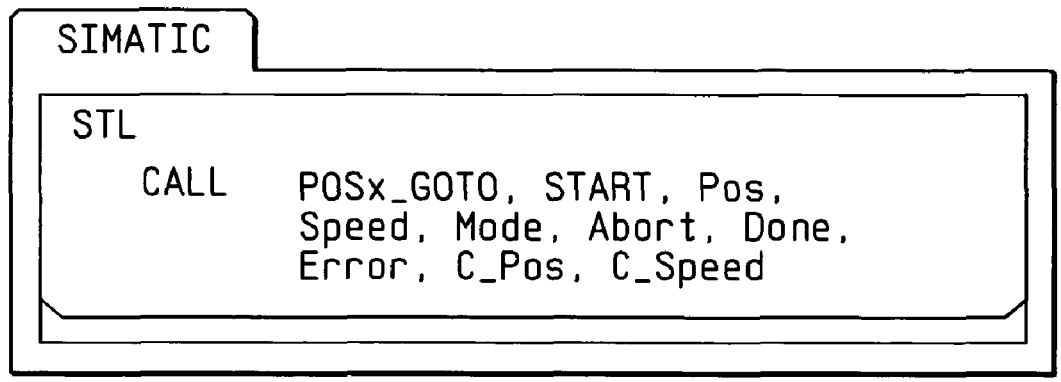

FIG. 25
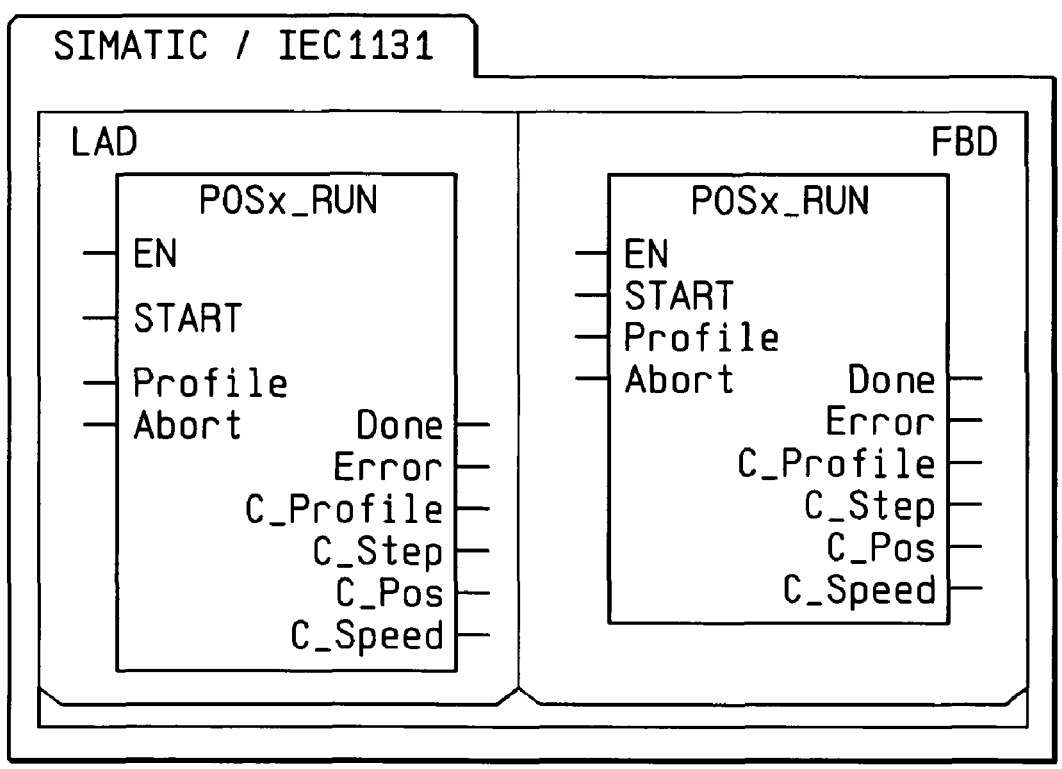
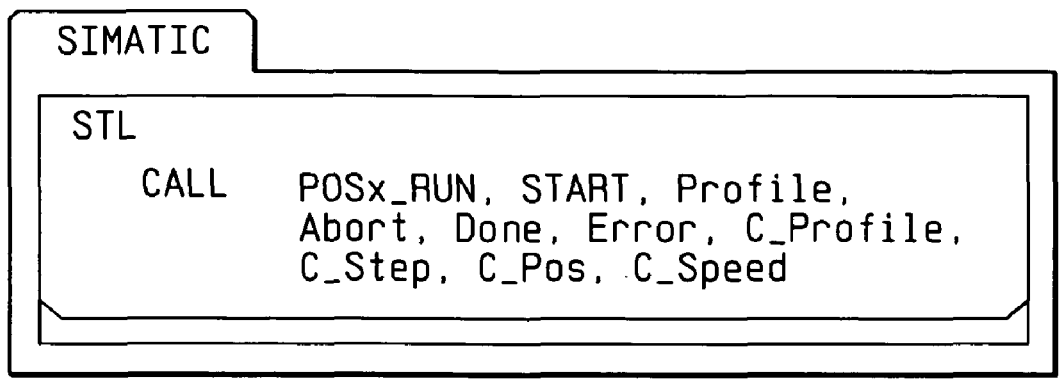

FIG. 26
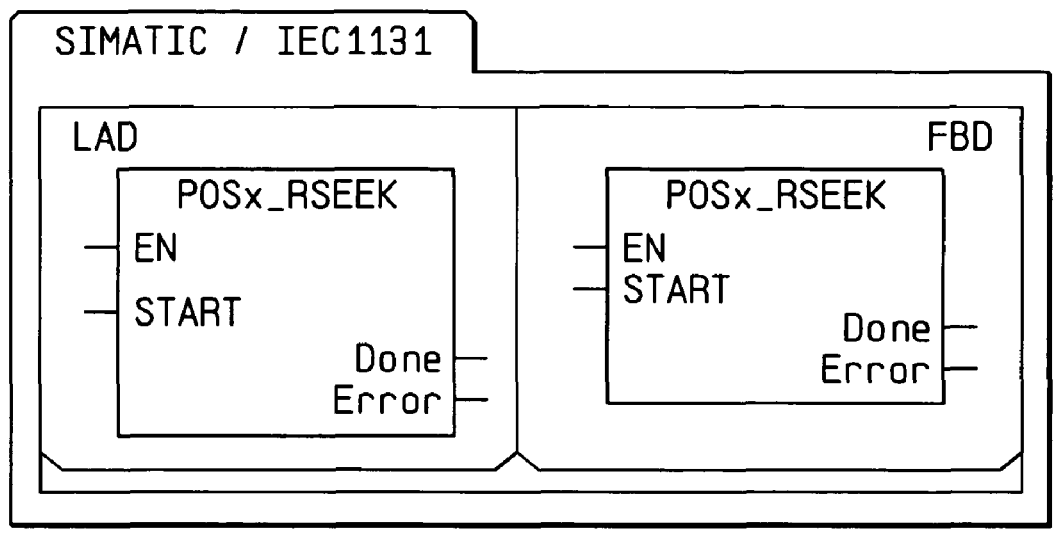
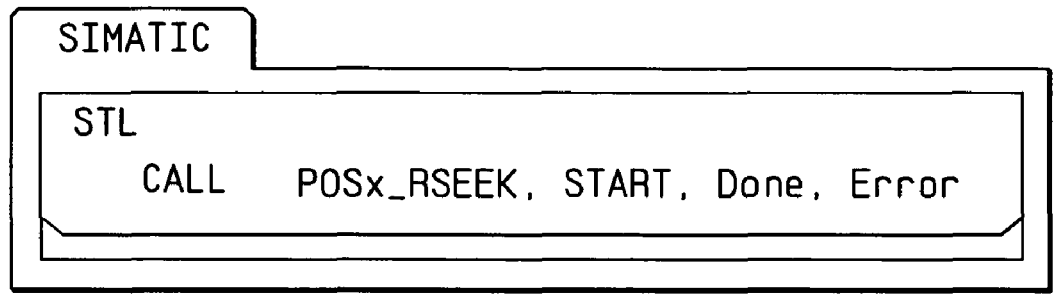

FIG. 27
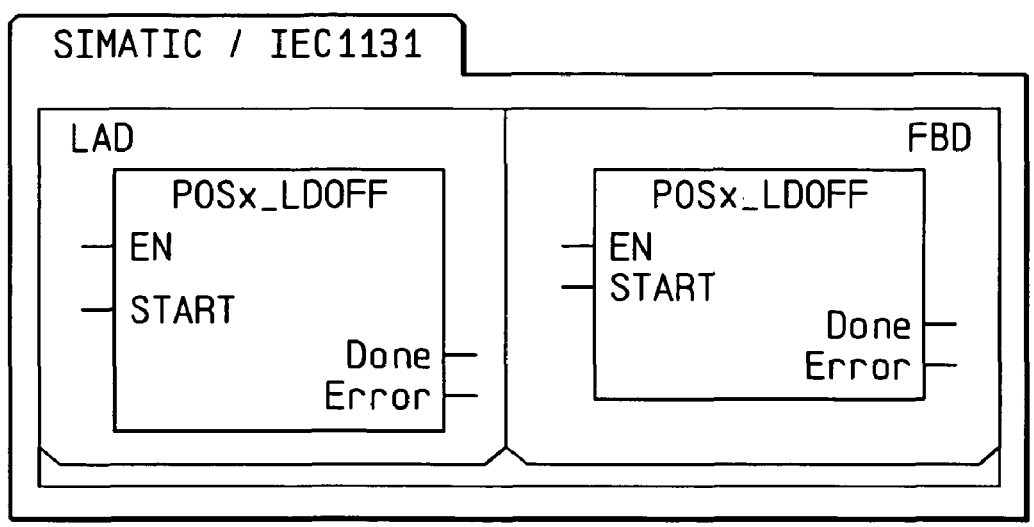
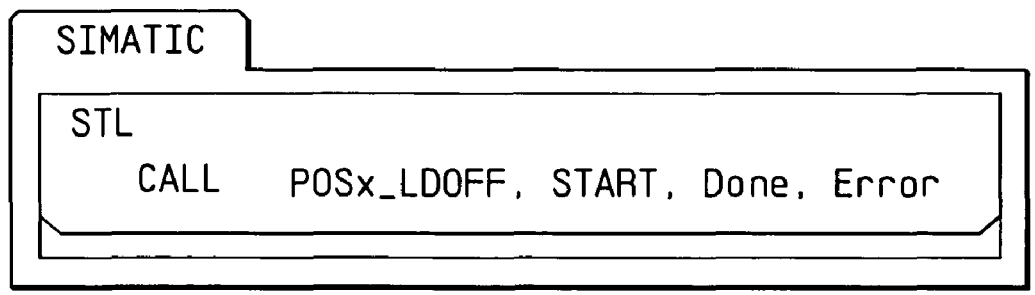

FIG. 28
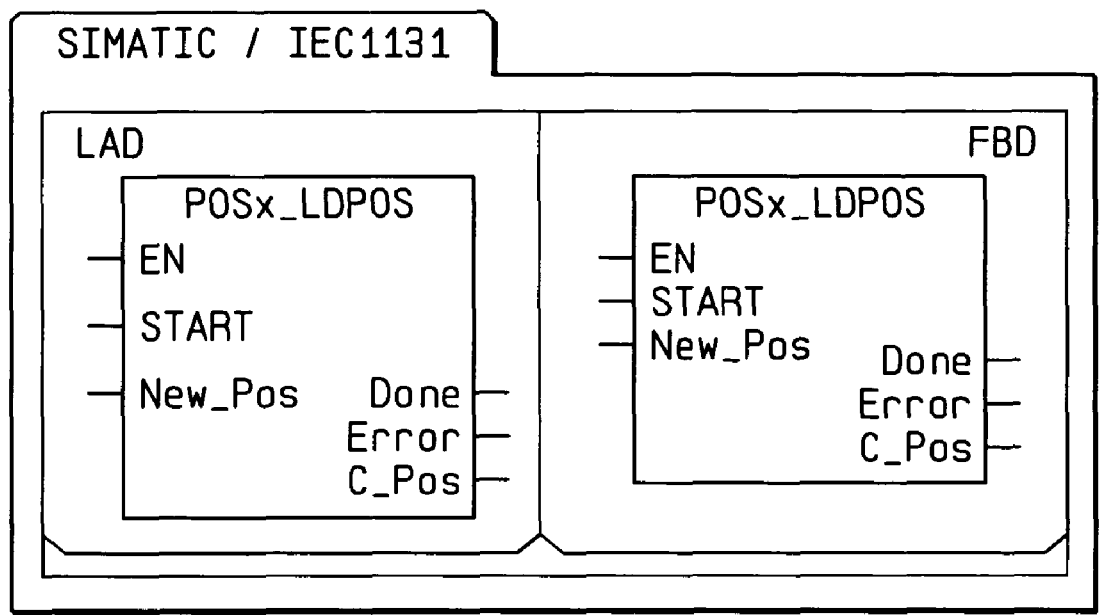
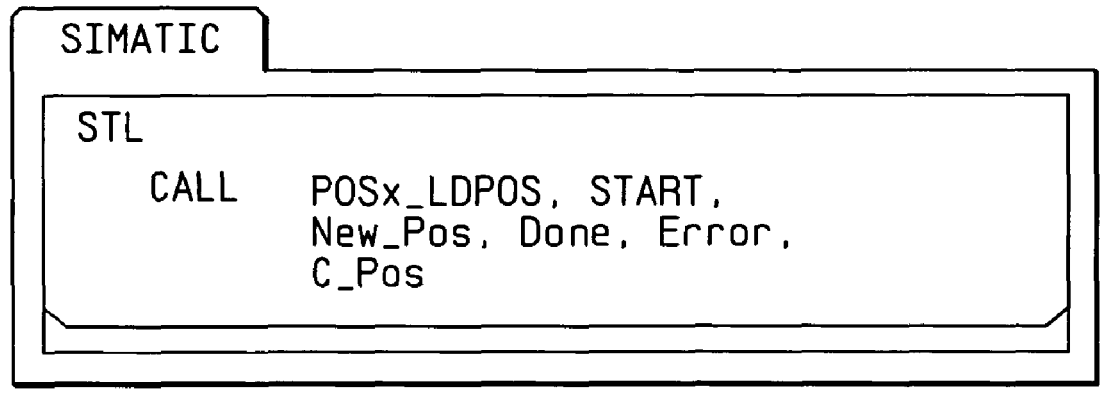

FIG. 29
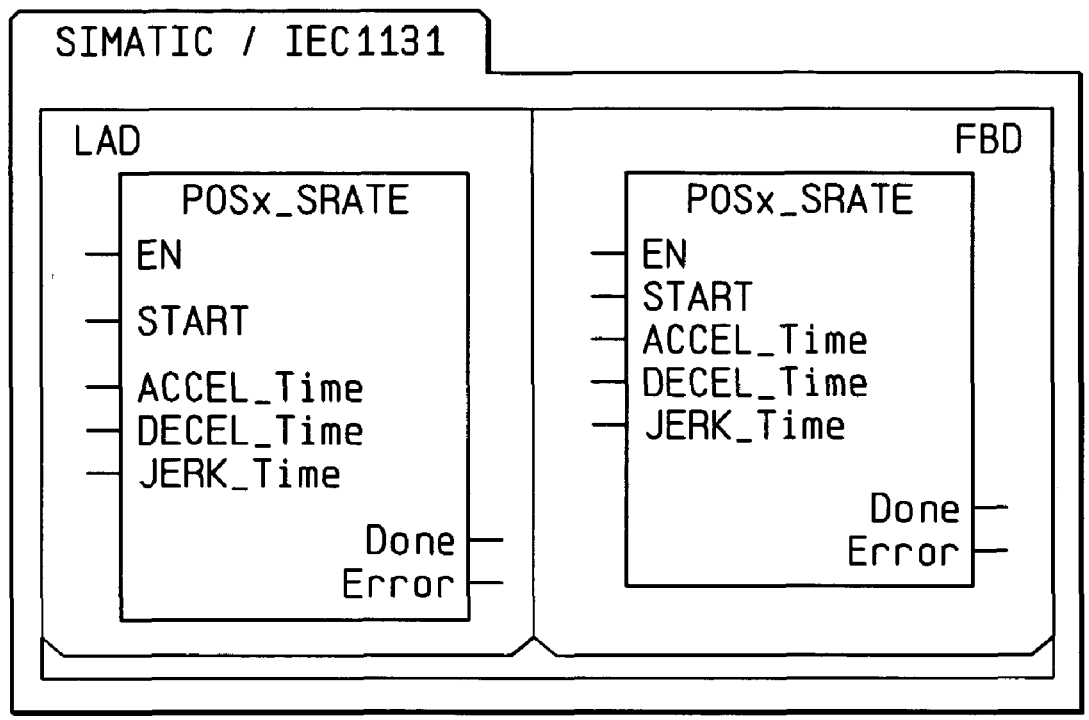
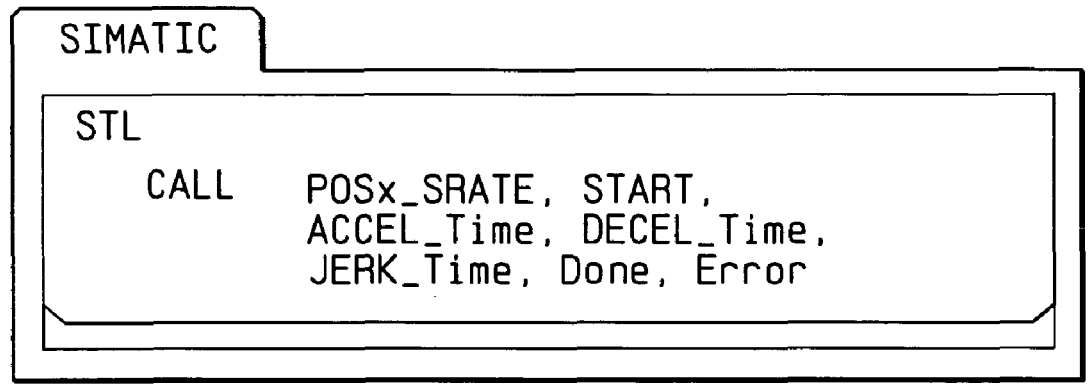

FIG. 31
31000
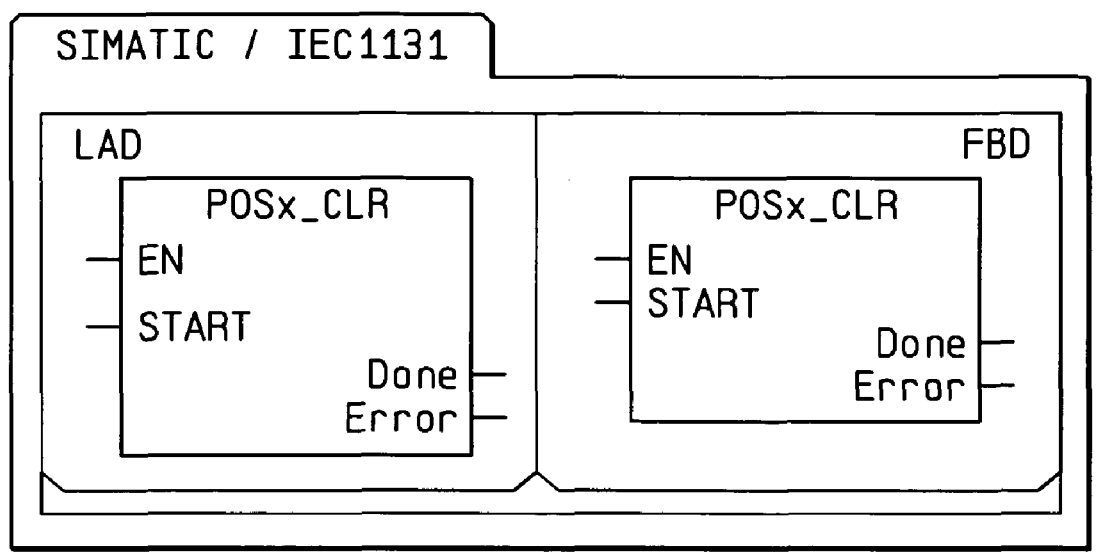
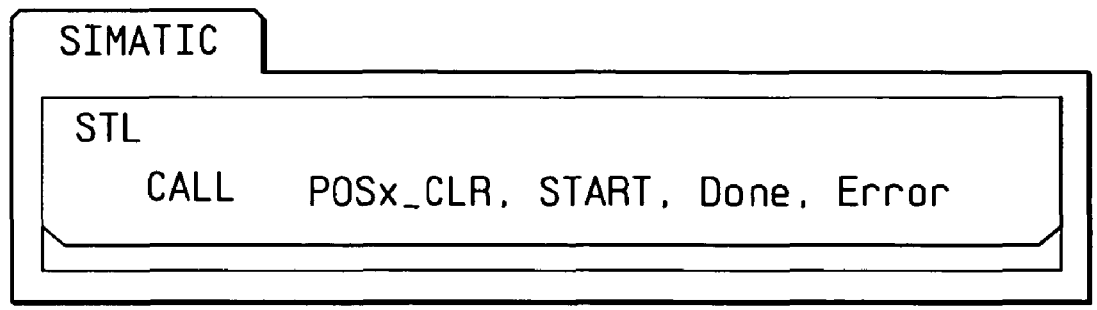

FIG. 32
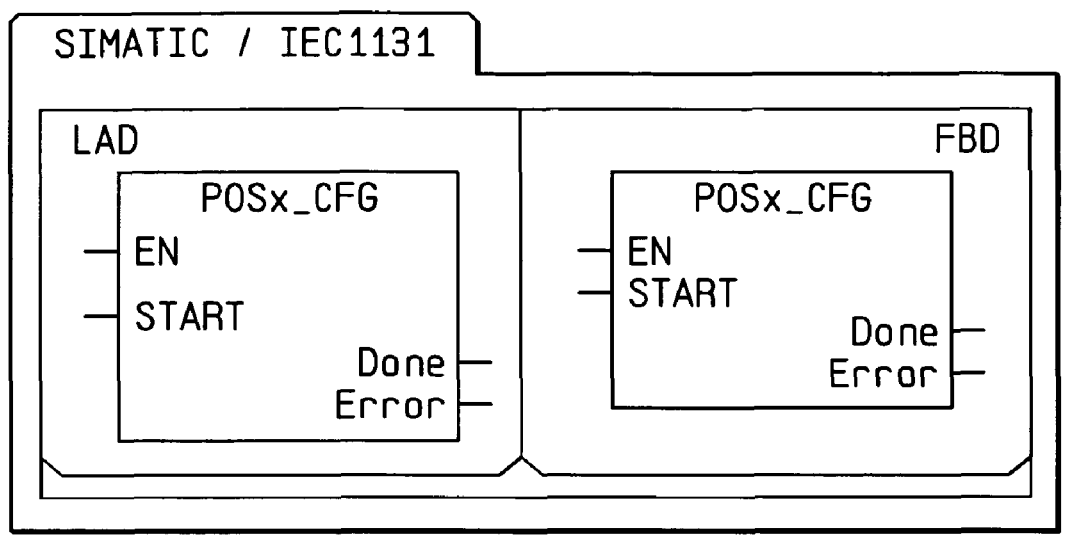
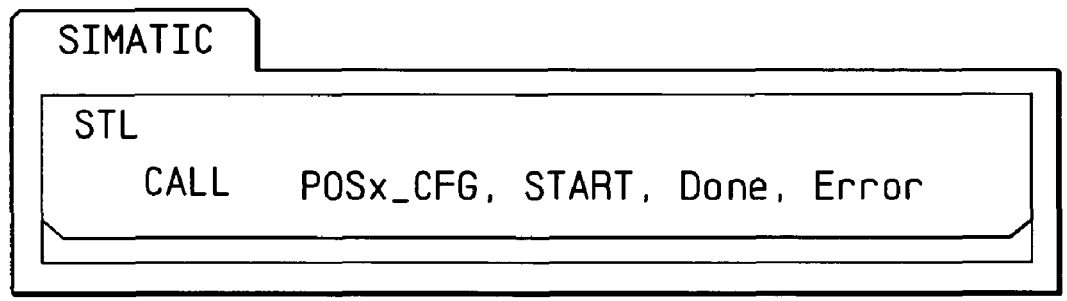

WIZARD FOR PROGRAMMING AN INTELLIGENT MODULE

CROSS-REFERENCE TO RELATED APPLICATIONS

This application claims priority to, and incorporates by reference herein in its entirety, the pending provisional application Ser. No. 60/384,979, filed 3 Jun. 2002.

BACKGROUND

In conventional systems it is necessary for a user to comprehend an intelligent module's configuration parameters and its placement in memory. For example, a user is required to create configuration tables from scratch, and to manually ensure that specified parameters for an intelligent module are configured within acceptable ranges.

In conventional systems, in order to control the operation of an intelligent module through a user's program, it is necessary to understand the specific limitations and timing issues involved with transferring data between an intelligent module and a controller, such as a program logic controller (PLC), as well as data transfers between the intelligent module and remote devices.

Hence, conventional systems require that a user spend a significant amount of time learning intimate details of the intelligent module's operation and creating customized program code to interface with an intelligent module. As a result, application development time is far longer than would otherwise be necessary. Further, the user requires additional time to debug the customized program code, since module interface code is inherently difficult to verify in a debugging environment.

It will be appreciated that each new project typically requires modifications to the code of the intelligent module. These modifications, regardless if minor or major, typically require significant modifications to the interface code. Therefore, even minor modifications to an intelligent module require additional programming cycles to create, configure and debug an interface module.

It will also be appreciated that a user may not have access to the source code or to documentation associated with the executable code of an intelligent module or of an interface module. Therefore, a user will not have the direction and guidance necessary to perform maintenance. A user will also be very dependent on an original project during maintenance of an existing PLC program. If a user did not have the original source project when they uploaded a working PLC program, the user would have no comments or symbolic names to aid in the maintenance of the program. Any modifications to the intelligent module configuration had to be accomplished without the aid of any program documentation.

SUMMARY

It will be appreciated that the present invention comprises a wizard which enables a user to configure and program an intelligent module by answering a series of questions about a specific application. The output of the wizard includes two distinct components. The wizard generates a parameter configuration for an intelligent module, reflecting the choices specified by a user for a specific application. The wizard also generates a set of customized instructions for use in a program. These instructions are specific to the choices that the user input into the wizard, and can be used in the same manner as standard instructions. It will be appreciated that in an embodiment of the invention the application, program and instructions applies to a Program Logic Controller (PLC).

In an embodiment, the present invention comprises a wizard which enables a user to configure and use an intelligent module with a PLC program without having to know or understand the details of the intelligent module's configuration or operation. Therefore, the parameterizing of the intelligent module occurs in the background so that the user is not required to understand or review the details of parameterizing the intelligent module.

The wizard also enables the modification of existing wizard configurations. This allows a user to modify intelligent module parameters entirely throughout the wizard. Again, a user is not required to understand or review the details of parameterizing the intelligent module operation It will be appreciated that the learning curve for programming and using an intelligent module is greatly reduced. There is no need for the user to learn unnecessary details of the intelligent module's internal operations. It will also be appreciated that the time required for a user to create an application is similarly reduced. A user is not required to manually write program code for interfacing with an intelligent module. Since the wizard generates customized program code based on the user's inputs in the wizard, a user can place calls to this code in the same manner as a call to a standard PLC instruction.

It will further be appreciated that the wizard provides automatic range checking for module parameters, and suggests memory usage to avoid conflicts with a user's program. The time required for the user to debug an application is greatly reduced, since the code generated by the wizard is pre-tested and verified under real-world conditions.

Since the wizard is re-editable, a user can enter changes to the user's existing module configurations through the wizard. A user is not required to edit the code manually. Certain exemplary embodiments of the present invention facilitate maintenance of an executing PLC program. A user may re-execute the intelligent module wizard from a PC or upload the program from a PLC. This enables a user to modify module configurations and regenerates documentation and symbolic names for the intelligent module configuration.

BRIEF DESCRIPTION OF THE DRAWINGS

The invention and its wide variety of potential embodiments will be readily understood via the following detailed description of certain exemplary embodiments, with reference to the accompanying drawings in which:

FIG. 7A is an exemplary embodiment of rotation options for selecting positive polarity for an application 7000 of the present invention.

FIG. 7B is an exemplary embodiment of rotation options for selecting negative polarity for an application 7100 of the present invention.

FIG. 22 is a block diagram of an exemplary function block 22000 of the present invention.

FIG. 23 is a block diagram of an exemplary function block 23000 of the present invention.

FIG. 24 is a block diagram of an exemplary function block 24000 of the present invention.

FIG. 25 is a block diagram of an exemplary function block 25000 of the present invention.

FIG. 26 is a block diagram of an exemplary function block 2600 of the present invention.

FIG. 27 is a block diagram of an exemplary function block 27000 of the present invention.

FIG. 28 is a block diagram of an exemplary function block 28000 of the present invention.

FIG. 29 is a block diagram of an exemplary function block 29000 of the present invention.

FIG. 31 is a block diagram of an exemplary function block 31000 of the present invention.

FIG. 32 is a block diagram of an exemplary function block 32000 of the present invention.

DETAILED DESCRIPTION

Figure 1:
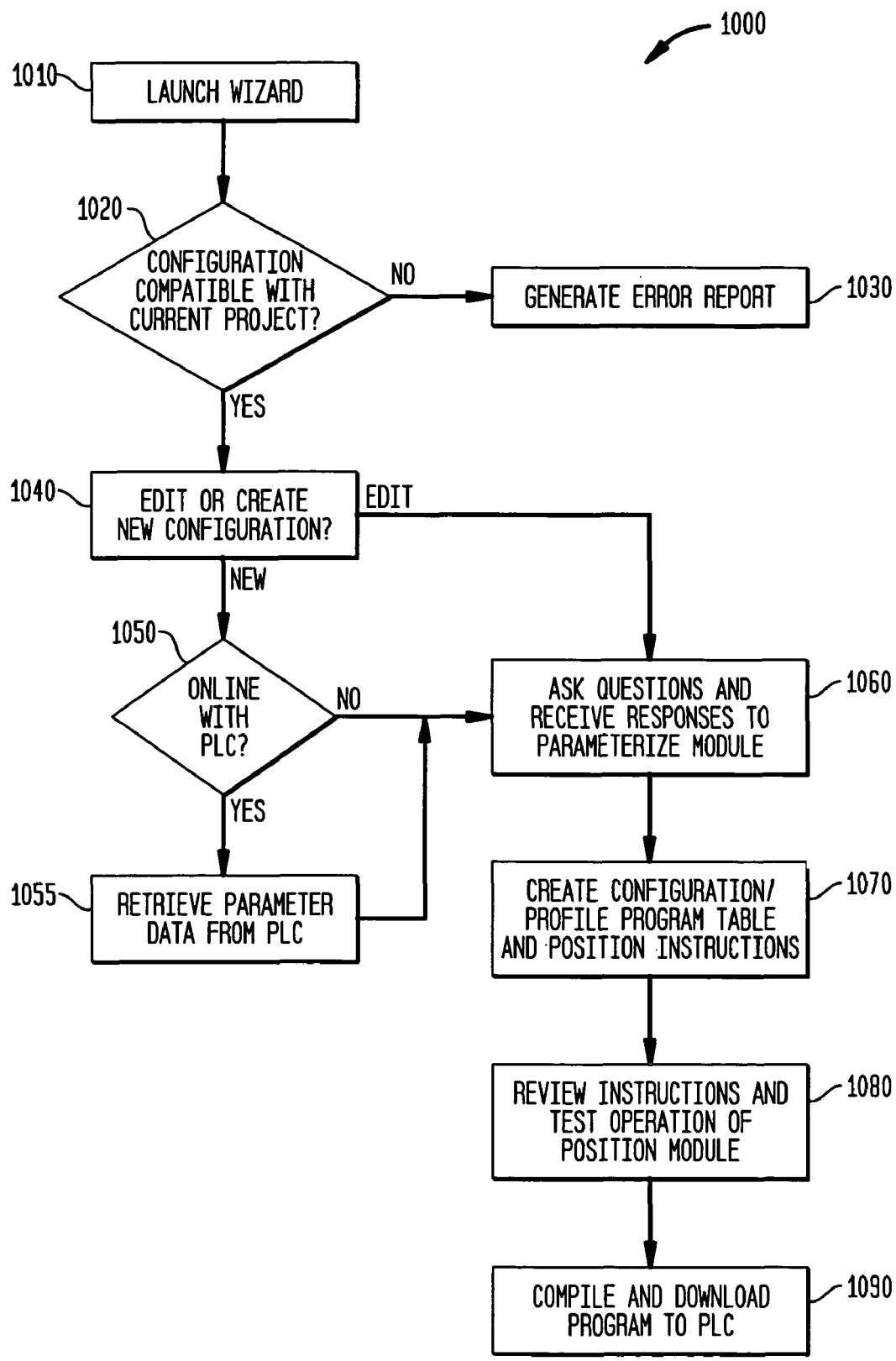
FIG. 1 is a flow diagram of an exemplary embodiment of a method 1000 of the present invention.

FIG. 1 is a flowchart of an exemplary embodiment of a method 1000 of the present invention. In certain embodiments, method 1000 can be utilized in conjunction with an intelligent position module that affects a motion device. An intelligent position module can be any function module capable of generating pulse trains used for control of the speed and position of motion devices. A motion device can be any device capable of being controlled by a pulse train, including a motion controller, such as a stepper motor controller, a servo controller, an actuator controller, etc.; a motion drive, such as a stepper drive, servo drive, etc.; and/or a actuator, such as a stepper motor, servomotor, linear motor, motor, ball screw, servo valve, hydraulic actuator, pneumatic valve, etc.

A position module, also known as an intelligent module, generates the pulse trains required to control motion based on configuration information stored in the memory of a PLC. A position control wizard, (wizard), facilitates creation, testing, and maintenance of configuration information. It will be appreciated that in certain preferred embodiments, a Siemens EM 253 is the position module, Siemens STEP 7-Micro/WIN is the program operating system and Siemens S7-200 is the PLC.

At activity 1010, a wizard is launched, potentially by a user for configuring the position module. It will be appreciated that a wizard may be launched and executed off-line, so that it is not necessary for the wizard to execute from a processing device that is connected to a PLC. It will also be appreciated that a wizard may be launched when a current project is open that includes configuration information for a position module.

At activity 1020, it is determined whether configuration information is compatible with the current project. If not an acceptable configuration, at activity 1030 an error report is generated. If an acceptable configuration, at activity 1040, a user receives a query to either edit an existing wizard configuration or to create a new wizard configuration.

If a user chooses to create a new configuration, a default configuration is generated, and presented to the user to modify. At activity 1050, if the program platform and wizard are online with a PLC and an attached position module, at activity 1055, the program platform retrieves parameter data from the PLC. It will be appreciated that retrieval of the parameter data lessens the burden of the user to configure the position module.

At activity 1060, the wizard queries a user for responses to parameterize a position module. It should be noted that the wizard preferably explains each parameter in detail to enable a user to enter an appropriate choice. If the user requires additional explanation, a user can press F1 at any time to access the program platforms online help web site. It will be appreciated that certain preferred embodiments provide a Siemens STEP 7-Micro/WIN online help for context-specific help about the current wizard topic.

At activity 1070, when a user completes the wizard configuration, and selects "Finish", the user's configuration selections entered into the wizard are processed to automatically generate a module configuration in the correct format. The configuration is generated in the user's project, and each parameter is documented to enable the user to print for review and retention of project records. The wizard also generates program instructions; function blocks that based on the module configuration. The program instructions are custom generated to reflect any special requirements that may result from the user's specific wizard choices.

At activity 1080, a user reviews the instructions and may test the operation of the position module. While one of ordinary skill in the art will understand that while review and testing is preferable, it is not a required step.

At activity 1090, a user "connects" the generated program to the intelligent position module by placing calls to the instructions generated by the wizard. It will be appreciated that the wizard-generated code may be called and used in much the same way as the standard PLC instructions.

The details of the intelligent module configuration and the user program are encrypted and downloaded to the PLC. It will be appreciated that the intelligent module configuration and the user program will be available when the user uploads the PLC program with the program operating system, such as Siemens STEP 7-Micro/WIN. Thereby allowing the intelligent module wizards to recreate a user's options, and allow the user to edit any existing configurations in the uploaded program.

Figure 2:
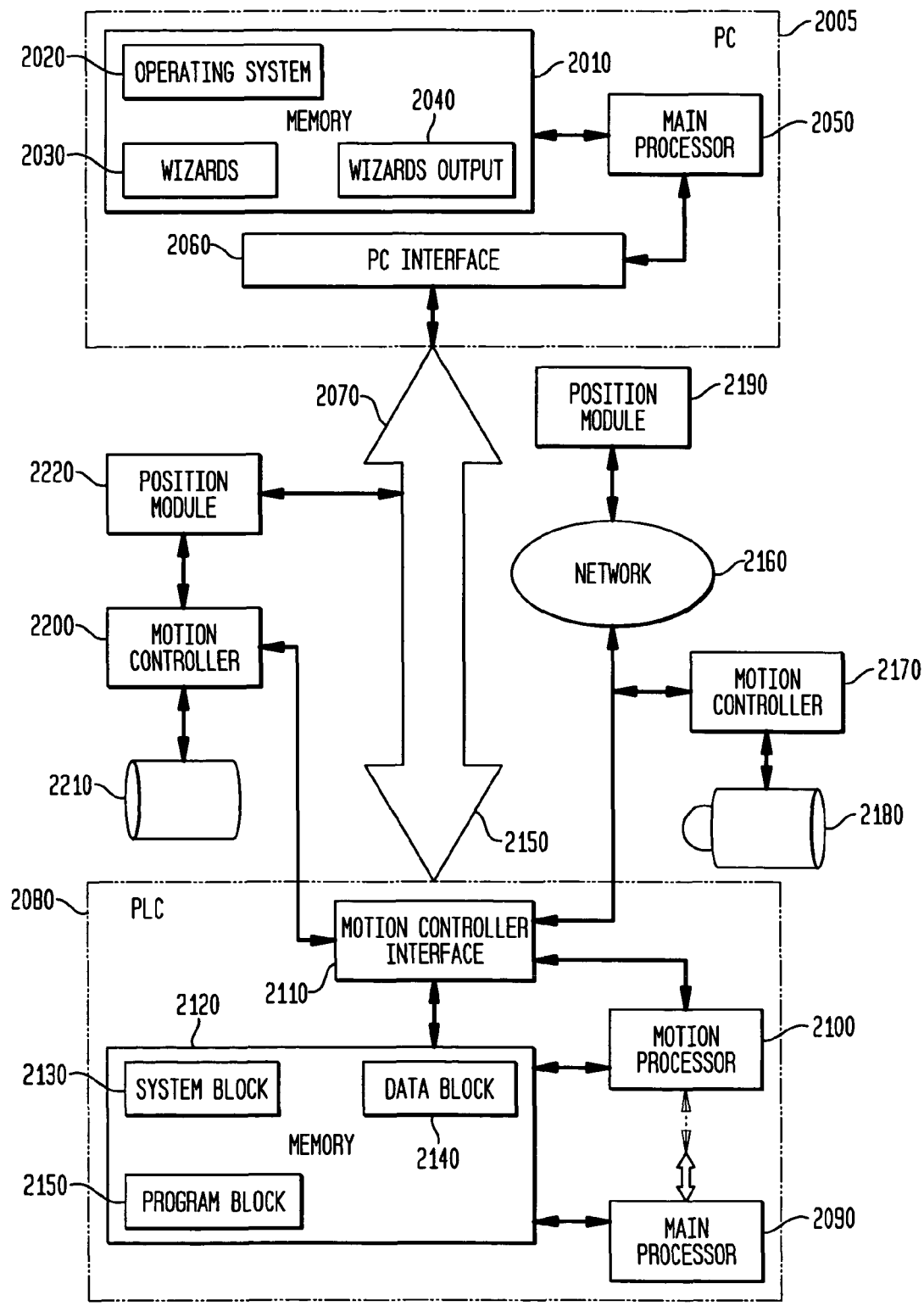
FIG. 2 is a block diagram of an exemplary embodiment of a system 2000 of the present invention.

FIG. 2 is a block diagram of an exemplary embodiment of a system 2000 of the present invention. System 2005 can include a portable computer ("PC") 2005 comprising a main processor 2050 connected to a memory 2010, such as dual port RAM and a PC interface 2060. The PC interface 2060 can be a communications interface, such as a bus, a connector, a telephone line interface, a wireless network interface, a cellular network interface, a local area network interface, a broadband cable interface, etc. The memory 2010 comprises a program operating system 2020, such as Siemens STEP 7-Micro/WIN, an intelligent module wizard 2030 and wizard's output 2040.

System 2000 can also include a programmable logic controller ("PLC") 2080, such as Siemens S7-200, comprising a main processor 2090 coupled via a connector to a motion processor 2100. In certain embodiments, motion processor 2100 can connect to a connector such as a system backplane and/or an expansion input/output bus of PLC 2080. Motion processor 2100 can be a commercially available general-purpose microprocessor. In another embodiment, motion processor 2100 can be an Application Specific Integrated Circuit (ASIC) that has been designed to implement in its hardware and/or firmware at least a part of a method in accordance with an embodiment of the present invention. In yet another embodiment, motion processor 2100 can be a Field Programmable Gate Array (FPGA).

Memory 2140 can contain instructions that can be embodied in software, which can take any of numerous forms that are well known in the art. Memory 2140 can include a system block 2120, a data block 2140 and a program block 2150.

PLC 2080 also can include a motion controller interface 2110, such as a bus, a connector, a telephone line interface, a wireless network interface, a cellular network interface, a local area network interface, a broadband cable interface, etc. Motion controller interface 2110 is preferably connected to a motion controller 2170 and to a motion controller 2200 that are separate from PLC 2080. Motion controllers 2170 and 2200 can be connected to a corresponding motion drive and/or an actuator 2210 and 2180.

Position module 2220 can be connected via communications interface 2070, such as a bus, to PLC 2080 and PC 2005. Alternatively, position module 2190 can be connected via network 2160 to PLC 2080 and PC 2005. Network 2160 can be a public switched telephone network (PSTN), a wireless network, a cellular network, a local area network, the Internet, etc.

It will be appreciated that although two position modules are shown in FIG. 2, for the purposes of clarity, only position module 2220 will be discussed in subsequent figures.

Figure 3:
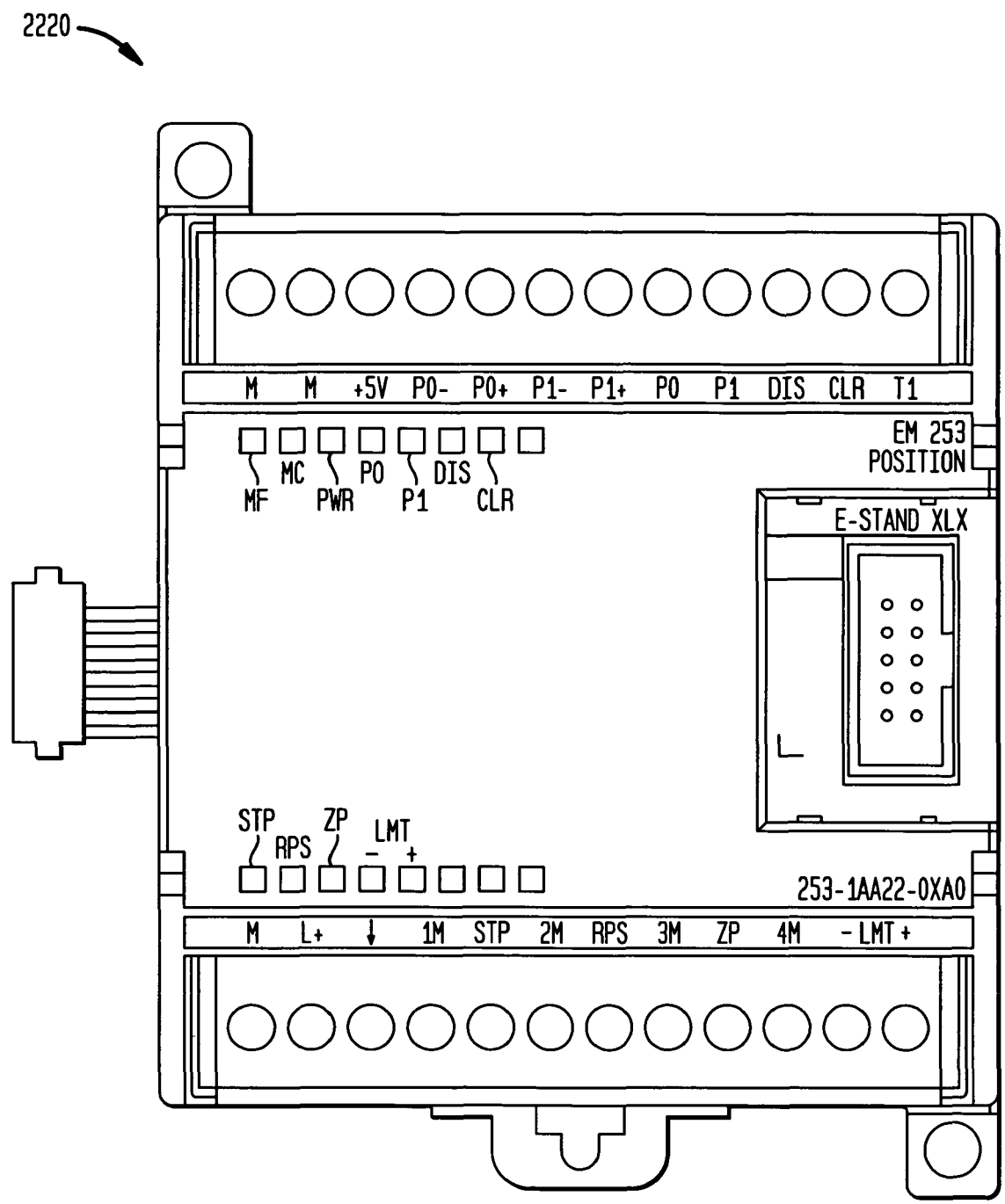
FIG. 3 is a block diagram of an exemplary embodiment of a position module 3000 of the present invention.

FIG. 3 is a block diagram of an exemplary embodiment of a position module 2220 of the present invention. Position module 2220 generates the pulse trains used for open-loop control of the speed and position for motors such as stepper motors and/or server motors. In certain embodiments of the present invention, position module 2220 is a Siemens EM 253 position module that is a Siemens S7-200 special function module. Position module 2220 communicates with PLC 2080 over the expansion I/O bus 2070 and can appear in a configuration as an intelligent module having eight digital outputs. Based upon configuration data and parameters provided in data block 2140, system block 2120 and program block 2150; position module 22000 generates the pulse trains required to control motion.

It will be appreciated that wizard 2030 enables a user to completely configure position module 2220. It will be further appreciated that because the program and configuration data are downloaded to PLC 2080, position module 2220 can be replaced without having to reprogram or reconfigure the removed position module(s). In certain preferred embodiments, as shown in Table 1, position modules 2220 can provide five digital inputs and four digital outputs for the interface to a motion program. These inputs and outputs are local to position modules 2220. One of ordinary skill in the art will understand that alternative intelligent modules for generating pulses may be implemented in the present invention.

TABLE 9-1

Inputs and Outputs of the Position Module

| Signal | Description |
| --- | --- |
| STP | The STP input causes the module to stop the motion in progress. You can select the desired operation of STP within the Position Control wizard. |
| RPS | The RPS (Reference Point Switch) input establishes the reference point or home position for absolute move operations. |
| ZP | The ZP (Zero Pulse) input helps establish the reference point or home position. Typically, the motor driver/amplifier pulses ZP once per motor revolution. |
| LMT+ LMT− | LMT+ and LMT− inputs establish the maximum limits for motion travel. The Position Control wizard allows you to configure the operation of LMT+ and LMT− inputs. |
| P0 P1 P0+, P0− P1+, P1− | P0 and P1 are open drain transistor pulse outputs that control the movement and direction of movement of the motor. P0+, P0− and P1+, P1− are differential pulse outputs that provide the identical functions of P0 and P1, respectively, while providing superior signal quality. The open drain outputs and the differential outputs are all active simultaneously. Based upon the interface requirements of motor driver/amplifier, you choose which set of pulse outputs to use. |
| DIS | DIS is an open drain transistor output used to disable or enable the motor driver/amplifier. |
| CLR | CLR is an open drain transistor output used to clear the servo pulse count register. |

Figure 4:
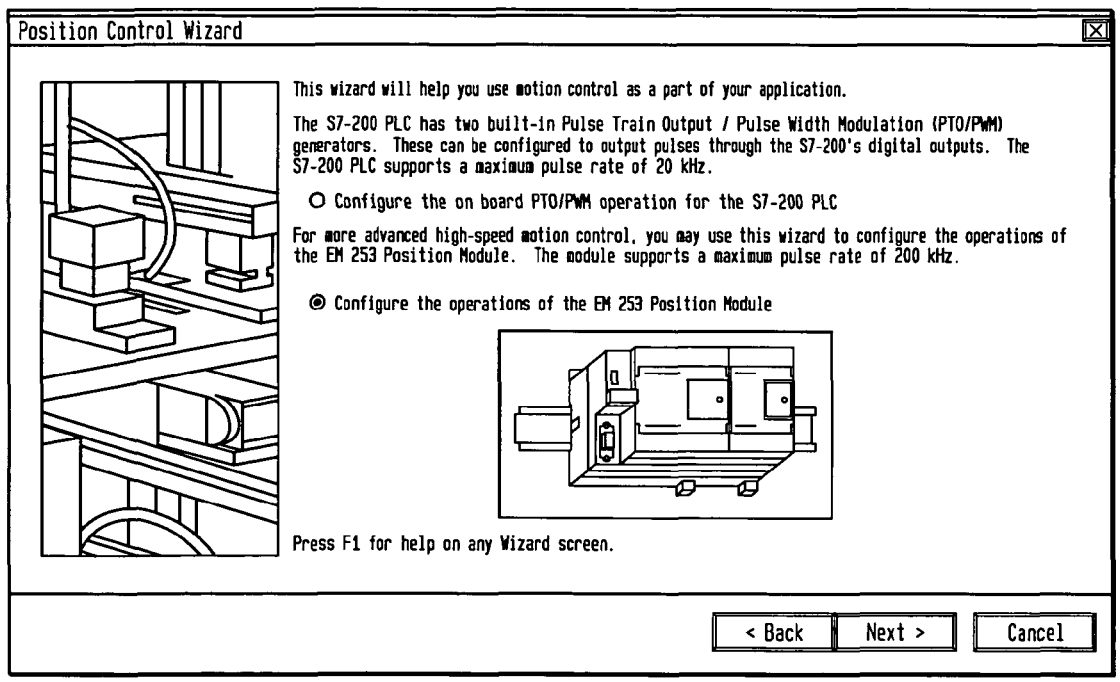
FIG. 4 is an exemplary embodiment of a position control wizard screen 4000 of the present invention.

FIG. 4 is an exemplary embodiment of a wizard screen 4000 of the present invention. Wizard 2030 enables the generation of a configuration/profile table for position module 2220 to control a motion application. In order to execute Position Control wizard 2030, it will be appreciated that a project must have been compiled and set to symbolic addressing mode. To start wizard 2030, a user either clicks a Tools icon in the navigation bar and then double-clicks the Position Control Wizard icon, or selects a Tools> Position Control Wizard menu command. As shown in FIG. 4, wizard 2030 enables a user to configure either the operation of Position module 2220 or the PTO/PWM operation of a Pulse Output instruction. After a user selects an option for Position module 2220 and clicks Next, wizard 2030 guides a user through the steps required to configure Position module 2220.

Figure 5:
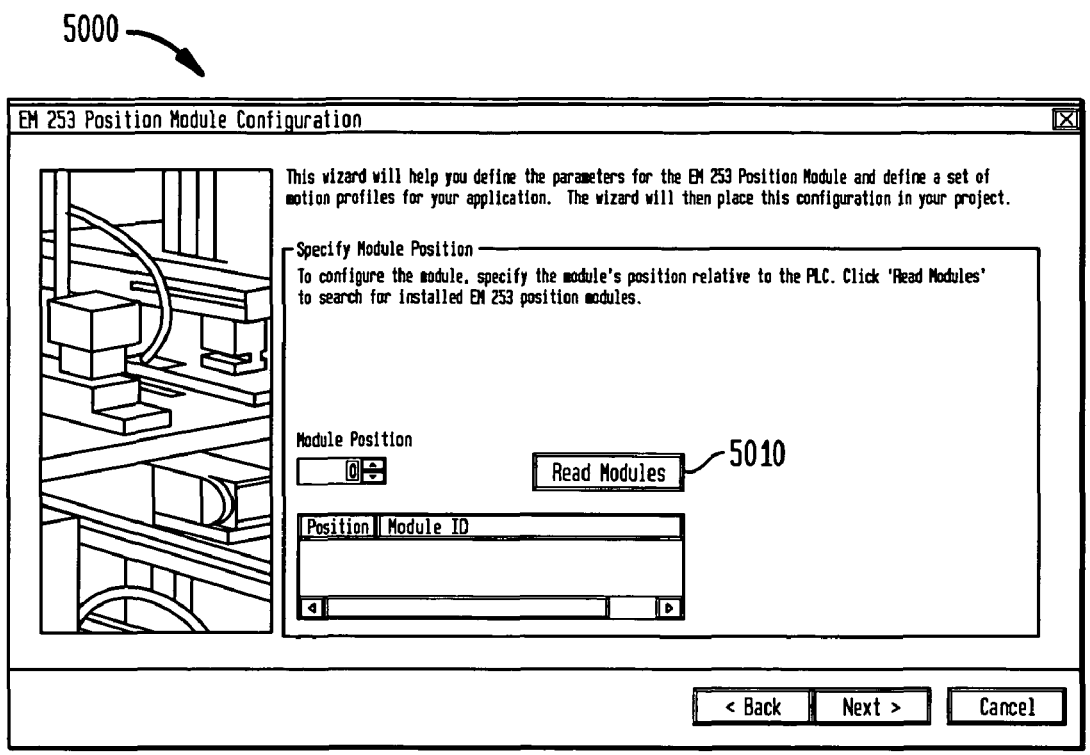
FIG. 5 is an exemplary embodiment of a position control wizard screen 5000 of the present invention.

FIG. 5 is an exemplary embodiment of a wizard screen 5000 of the present invention. As shown, wizard 2030 helps a user define the parameters for position module 2220 and a set of motion profiles for a user's application. In response to a click of Read Modules button 5010, wizard 2030 automatically reads a module position of Position module 2220. By reading position module 2220, wizard 2030 can "pre-load" some of the options for the configuration, and thus saving the user from being required to later make certain decisions.

Figure 6:
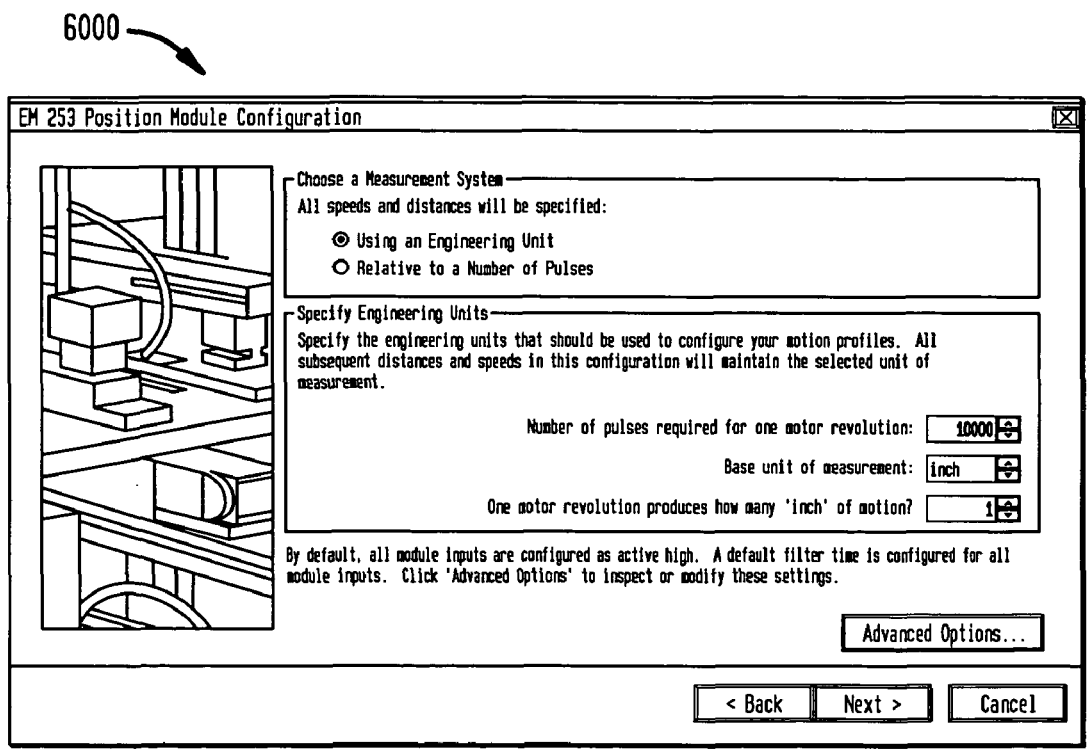
FIG. 6 is an exemplary embodiment of a position control wizard screen 6000 of the present invention.

FIG. 6 is an exemplary embodiment of a position control wizard screen 6000 of the present invention. As shown, a user selects a measurement system to be used throughout the wizard configuration process. A user can select to use either engineering units or pulses. It will be appreciated that if a user selects pulses, it is not necessary to specify additional information. However, if engineering units are selected, a user must enter additional data including; the number of pulses required to produce one revolution of a specified motor, the base unit of measurement (e.g., inch, foot, millimeter, or centimeter), and the amount of motion (or "units") provided by one revolution of the motor.

It will be appreciated that certain preferred embodiments in which program operating system 2020 is STEP 7-Micro/WIN, an EM253 Control Panel is provided that enables a user to modify the number of units per revolution after Position module 2220 has been configured. However, one of ordinary skill in the art will understand that if the measurement system is later changed, it is necessary to delete the entire configuration including any instructions generated by wizard 2030. It is then further necessary to enter selections consistent with the new measurement system.

In certain preferred embodiments, it will be appreciated that wizard 2030 provides an advanced options selection that enables a user to view and edit default input and output configurations for Position module 2220. For example, an Input Active Levels tab changes the activation level settings. When the level is set to High, a logic 1 is read when current is flowing in the input. When the level is set to Low, a logic 1 is read when there is no current flow in the input. A logic 1 level is always interpreted as meaning the condition is active. LED5 is illuminated when current flows in the input, regardless of activation level (Default=active high).

Further, the Input Filter Times tab enables a user to specify a delay time (range of 0.20 ms to 12.80 ms) for filtering the STP, RPS, LMT+, and LMT− inputs. This delay helps to filter noise on the input wiring that could cause inadvertent changes to the state of the inputs. (Default=6.4 ms). Lastly, the Pulse and Directional Outputs tab enables a user to specify a method for controlling direction. A user must first specify the polarity of the outputs.

FIG. 7A is an exemplary embodiment of rotation options for selecting positive polarity for an application 7000 of the present invention. FIG. 7B is an exemplary embodiment of rotation options for selecting negative polarity for an application 7100 of the present invention. For an application that uses positive polarity, a user select one of the methods shown in FIG. 7A to accommodate the drive and orientation of the application. Position module 2220 emits pulses from the P0 output for positive rotation and pulses from the P1 output for negative rotation. If position module 2220 emits pulses from the P0 output, the module turns on the P1 output for positive rotation and turns off the P1 output for negative rotation (This is the default setting).

For an application that uses negative polarity, a user selects one of the methods shown in FIG. 7B to accommodate the drive and orientation of an application. Position module 2220 emits pulses from the P0 output for negative rotation and pulses from the P1 output for positive rotation. If position module 2220 emits pulses from the P0 output, the module turns off the P1 output for positive rotation and turns on the P1 output for negative rotation.

Figure 8:
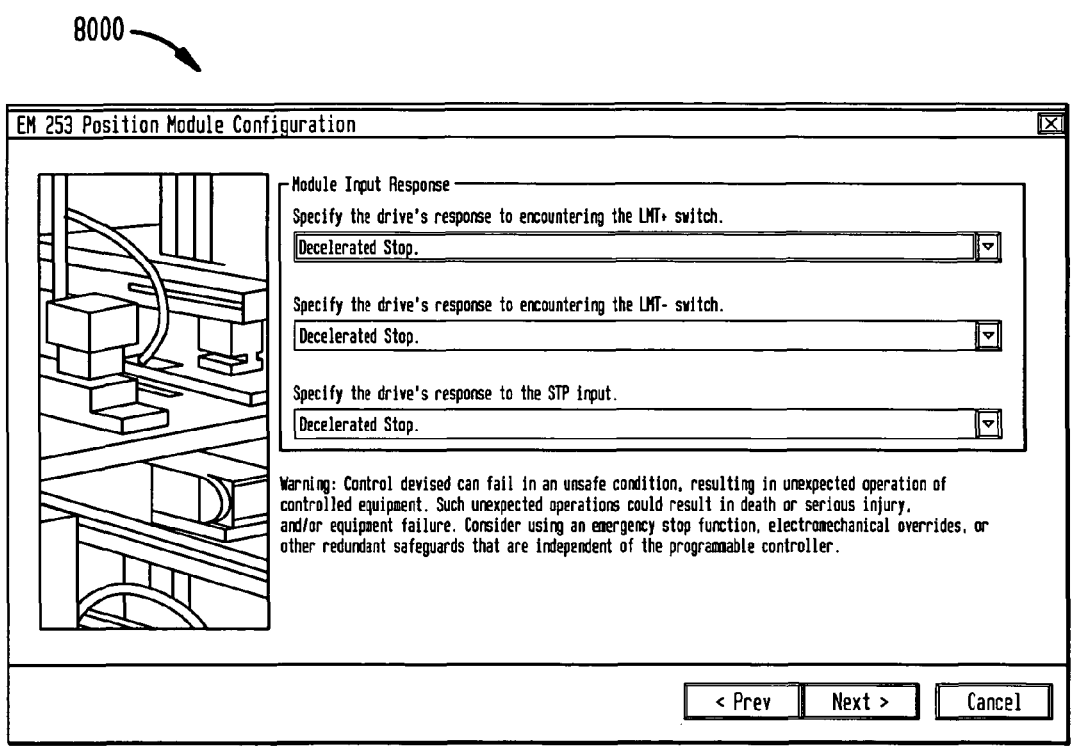
FIG. 8 is an exemplary embodiment of a position module configuration screen 8000 of the present invention.

FIG. 8 is an exemplary embodiment of a position module configuration screen 8000 of the present invention. As shown, a user specifies how position module 2220 will respond to certain input conditions such as an LMT+switch, an LMT−switch, and the STP input. For each, position module 2220 either responds with no action (ignore the input condition), decelerate to a stop (default), or an immediate stop.

Figure 9A:
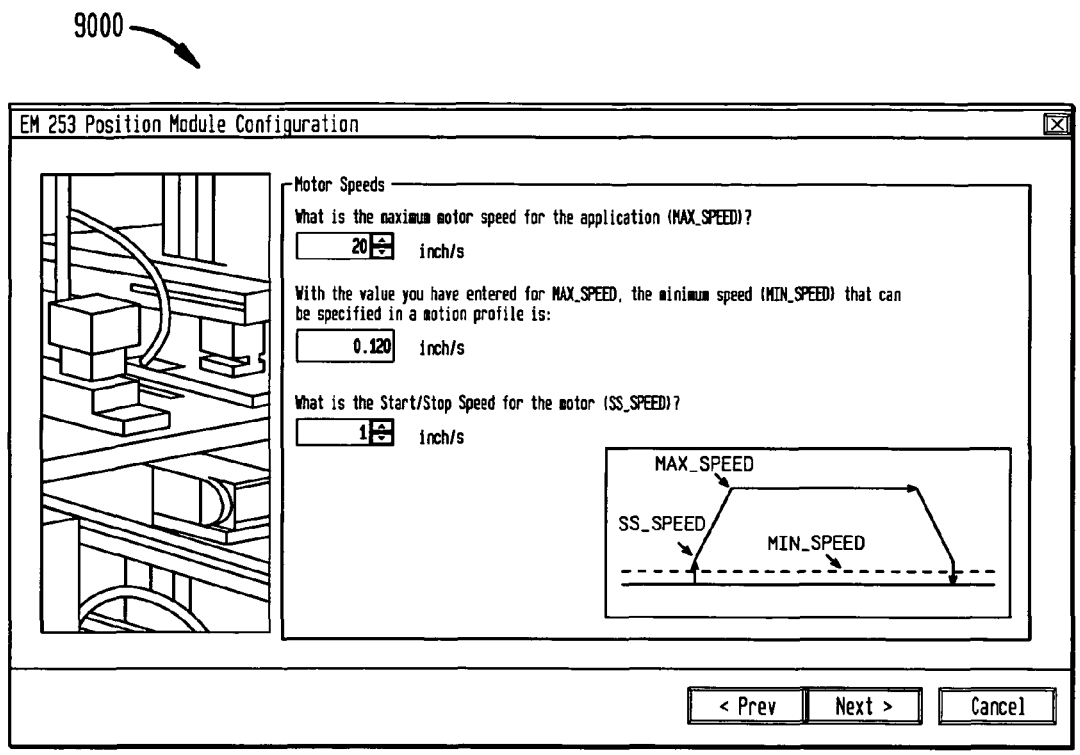
FIG. 9A is an exemplary embodiment of a position module configuration screen 9000 of the present invention.

FIG. 9A is an exemplary embodiment of a position module configuration screen 9000 of the present invention. As shown, a user inputs a maximum speed (MAX_SPEED) and a Start/Stop Speed (SS_SPEED) for the user's application. MAX_SPEED is a value for the optimum operating speed of the user's application within a torque capability of the user's motor. The torque required to drive the load is determined by friction, inertia, and the acceleration/deceleration times. Wizard 2030 calculates and displays a minimum speed that can be controlled by position module 2220 for a specified MAX_SPEED. D SS_SPEED is a value within the capability of the user's motor to drive a load at low speeds. If an SS_SPEED value is too low, the motor and load could vibrate or move in short jumps at the beginning and end of travel. If an SS_SPEED value is too high, the motor could lose pulses on start up, and the load could overdrive the motor when attempting to stop.

Figure 9B:
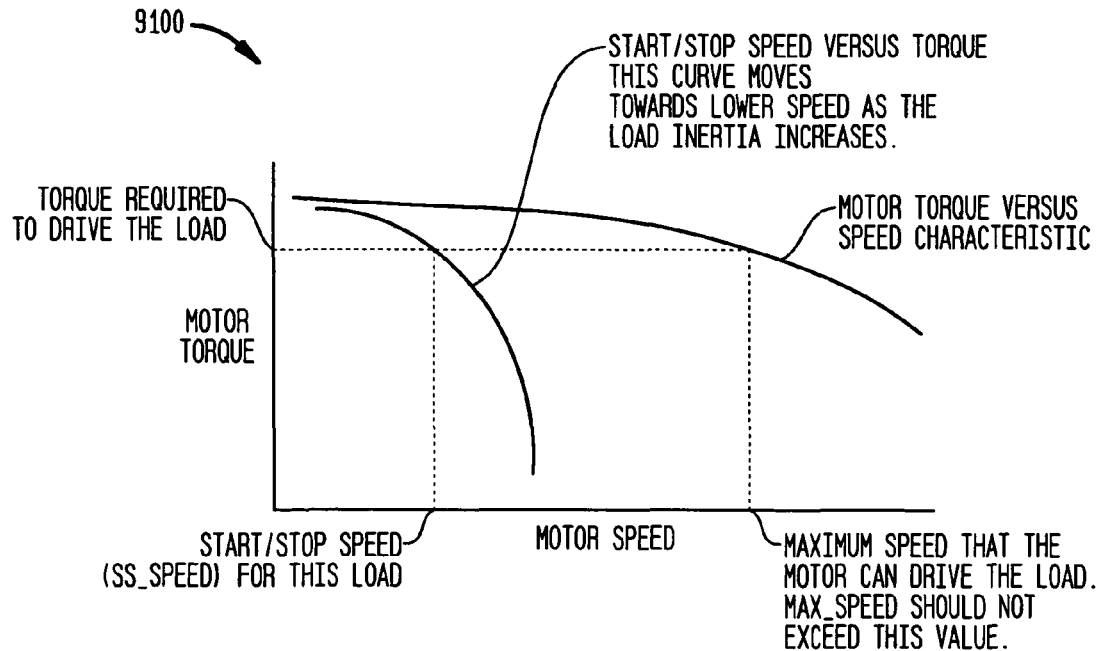
FIG. 9B is an exemplary embodiment of a conventional torque-speed curve graph for a motor 9100.

FIG. 9B is an exemplary embodiment of a conventional torque-speed curve graph for a motor 9100. Motor data sheets specify differently a start/stop (or pull-in/pull-out) speed for a motor and a given load. Typically, a useful SS_SPEED value is 5% to 15% of the MAX_SPEED value. An SS_SPEED value must be greater than the minimum speed displayed from a user's specification of MAX_SPEED. A user should refer to the motor's data sheet to select the correct speeds for a user's application.

Figure 10:
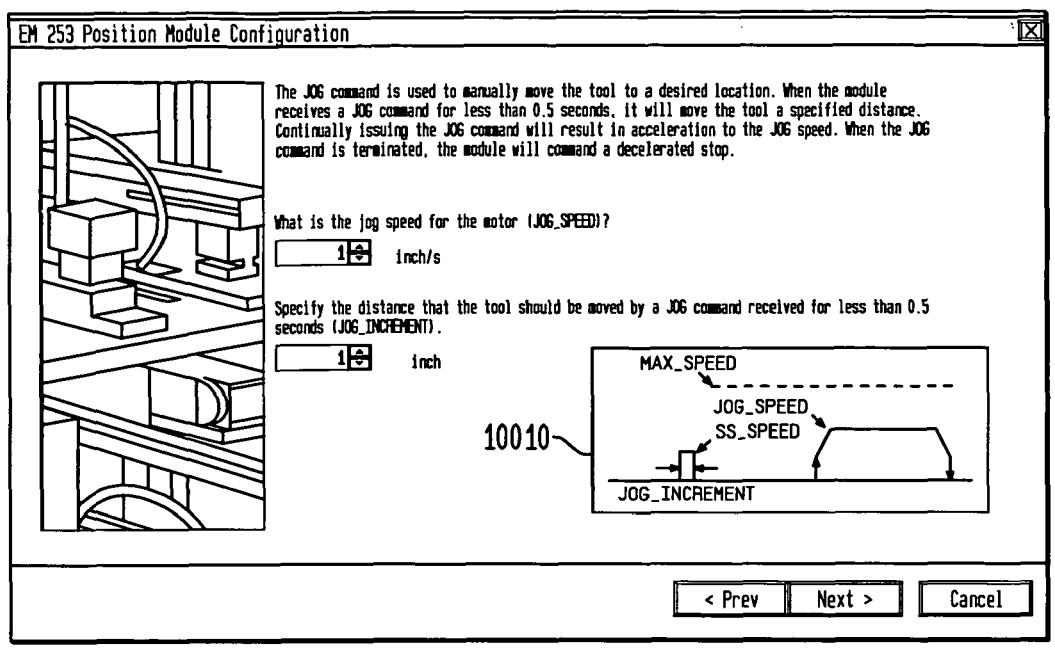
FIG. 10 is an exemplary embodiment of a position module configuration screen 10000 of the present invention.

FIG. 10 is an exemplary embodiment of a position module configuration screen 10000 of the present invention. As shown, a user inputs Jog command parameter values. A Jog command is used to manually move a tool to a desired location. Typically it is used then a user wishes to move a mechanism by small amounts ("manually tweak a mechanism"). Jog parameter values include JOG_SPEED, (Jog speed for the motor), a maximum speed that can be obtained while the JOG command remains active; and JOG_INCREMENT, a distance that a tool is moved by a momentary JOG command. A graph 10010 shows the operation of a Jog command. When position module 2220 receives a Jog command, it starts a timer. If the Jog command is terminated before 0.5 seconds has elapsed, position module 2220 moves the tool the amount specified in the JOG_INCREMENT at the speed defined by SS_SPEED. If a Jog command is still active when the 0.5 seconds have elapsed, position module 2220 accelerates to JOG_SPEED. Motion continues until the Jog command is terminated. Position module 2220 then performs a decelerated stop. It will be appreciated that for certain exemplary embodiments, a Jog command can be enabled from either an EM 253 control panel or from a position instruction.

Figure 11:
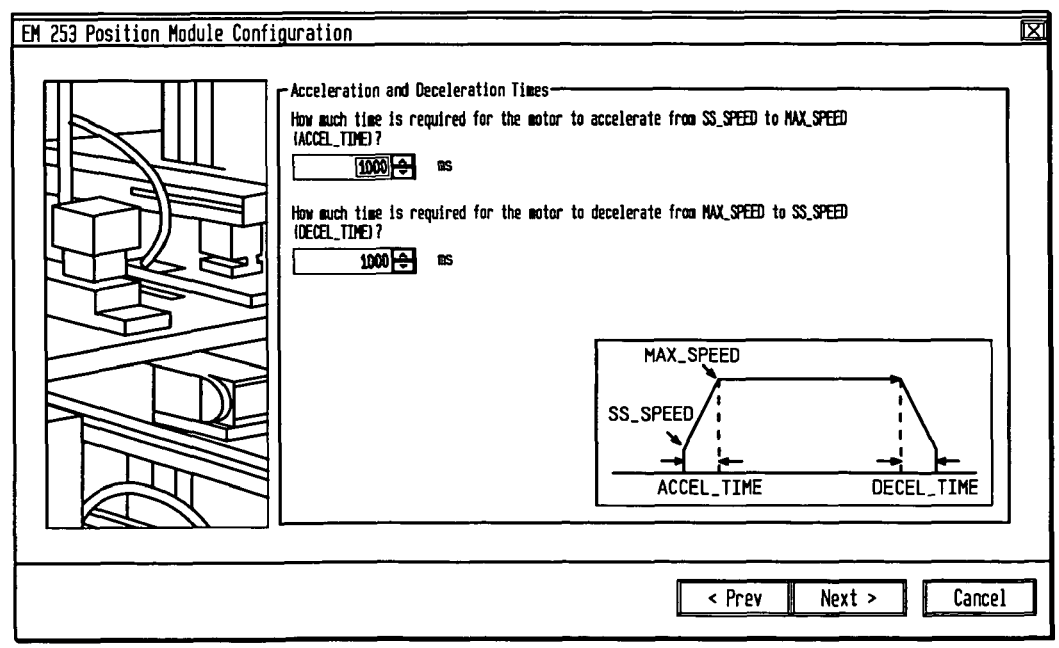
FIG. 11 is an exemplary embodiment of a position module configuration screen 11000 of the present invention.

FIG. 11 is an exemplary embodiment of a position module configuration screen 11000 of the present invention. As shown, a user sets acceleration and deceleration times of a motor. It will be appreciated that a default setting for both an acceleration time and a deceleration time is 1 second. However, typically motors can work with less than 1 second. A user inputs milliseconds for ACCEL_TIME, a time required for the motor to accelerate from SS_SPEED to MAX SPEED where the default is 1000 milliseconds; and DECEL_TIME, a time required for the motor to decelerate from MAX_SPEED to SS_SPEED where the default is equal to 1000 milliseconds.

It will be appreciated that as an application is tested, in certain exemplary embodiments, an EM 253 Control Panel can be used to adjust values as required. Application settings are optimized by gradually reducing the times until the motor begins to stall.

Figure 12:
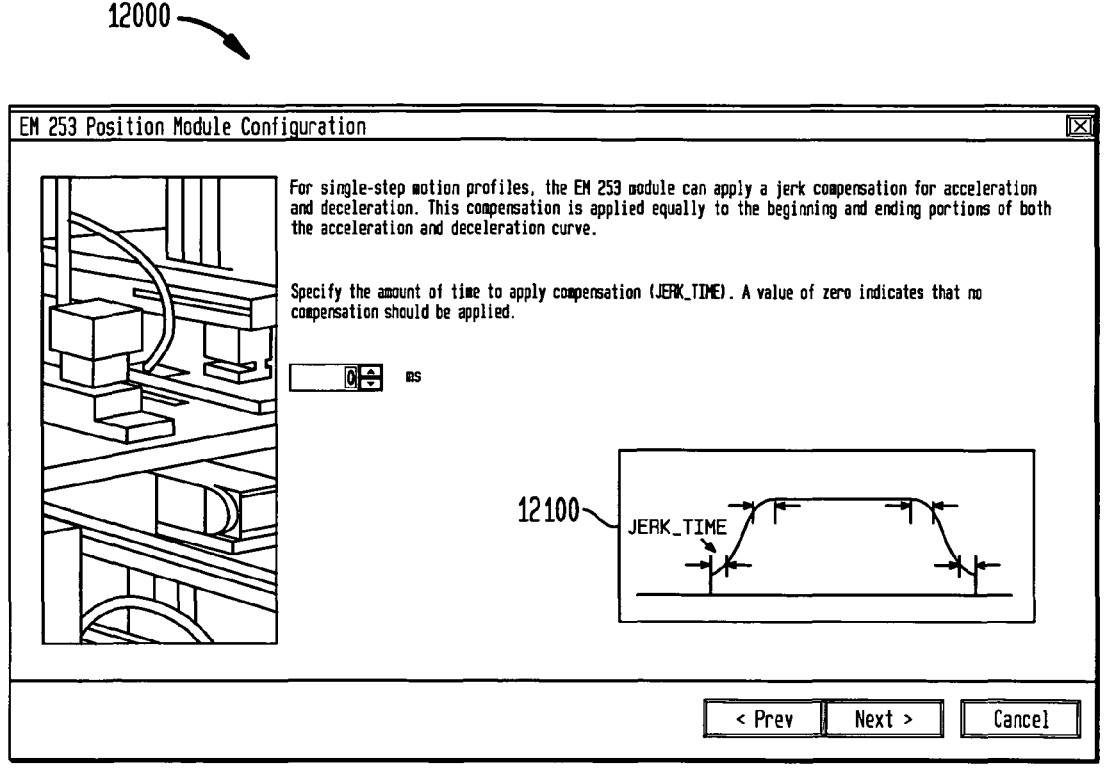
FIG. 12 is an exemplary embodiment of a position module configuration screen 12000 of the present invention.

FIG. 12 is an exemplary embodiment of a position module configuration screen 12000 of the present invention. It will be appreciated that jerk compensation provides smoother position control by reducing the jerk (rate of change) in acceleration and deceleration parts of a motion profile. As shown in graph 12100, reducing jerk improves position tracking performance. Jerk compensation, also known as "S curve profiling, can only be applied to simple one-step profiles. This compensation is applied equally to beginning and ending portions of both an acceleration and deceleration curve. It will be appreciated that jerk compensation is not applied to the initial and final step between zero speed and SS_SPEED.

A user inputs a jerk compensation by entering a time value (JERK_TIME). JERK-TIME is the time required for the acceleration to change from zero to the maximum acceleration defined by MAX_SPEED, SS_SPEED, and ACCEL_TIME, or equivalently for DECEL_TIME. It will be appreciated that a longer jerk time yields smoother operation with a smaller increase in total cycle time than would be obtained by simply increasing the ACCEL_TIME and DECEL_TIME. A value of zero indicates that no compensation should be applied. A JERK_TIME default is equal to zero milliseconds.

Figure 13A:
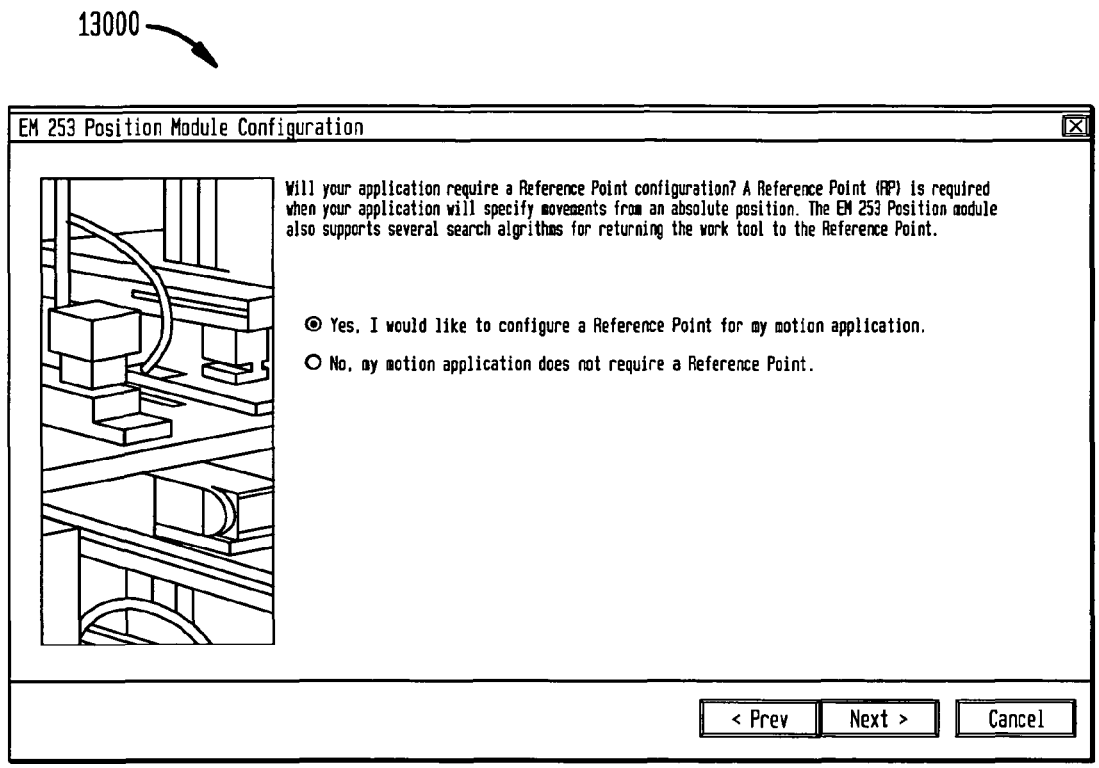
FIG. 13A is an exemplary embodiment of a position module configuration screen 13000 of the present invention.

FIG. 13A is an exemplary embodiment of a position module configuration screen 13000 of the present invention. It will be appreciated that if an application specifies movements from an absolute position, a user must establish a zero position that fixes position measurements to a known point on a physical system. In an exemplary embodiment, a user provides a reference point (RP) on a physical system. In order to facilitate this method, position module 2220 provides an external reference point switch (RPS) input for seeking the RP.

Reference Point Seek (RP seek) parameters that control how your motion application seeks the RP can also be configured. An RP can be centered in the RPS Active zone, an RP can be located on an edge of the RPS Active zone, or an RP can be located on a specified number of zero pulse (ZP) input transitions from an edge of the RPS Active zone.

As shown in FIG. 13A, to configure an RP, a user inputs RP seek speeds for the motor including: RP_FAST, an initial speed position module 2220 uses when performing an RP seek command; and RPSLOW, a speed of a final approach to the RP. A slower speed is preferably used on approach to the RP, so as not to miss it. It will be appreciated that typically an RP_FAST value is approximately two thirds of a MAX_SPEED value and an RP_SLOW value is the SS_SPEED value.

A user also inputs an initial seek direction (RPrn_SEEK_DIR) and a final approach direction (RP_APPR_DIR) for an RP Seek. These directions are specified as negative or positive. RPSEEK_DIR is the initial direction for the RP seek operation. Preferably the direction is from the work zone to the vicinity of the RP. It will be appreciated that limit switches play an important role in defining a region that is searched for the RP. It will be further appreciated that when performing an RP seek operation, encountering a limit switch can result in a reversal of the direction, which allows the search to continue where the default is negative. RP_APPR_DIR is the direction of the final approach to the RP. In order to reduce backlash and provide greater accuracy, RP_APPR_DIR moves in the same direction as the normal work cycle. It will be appreciated that the default is positive.

Figure 13B:
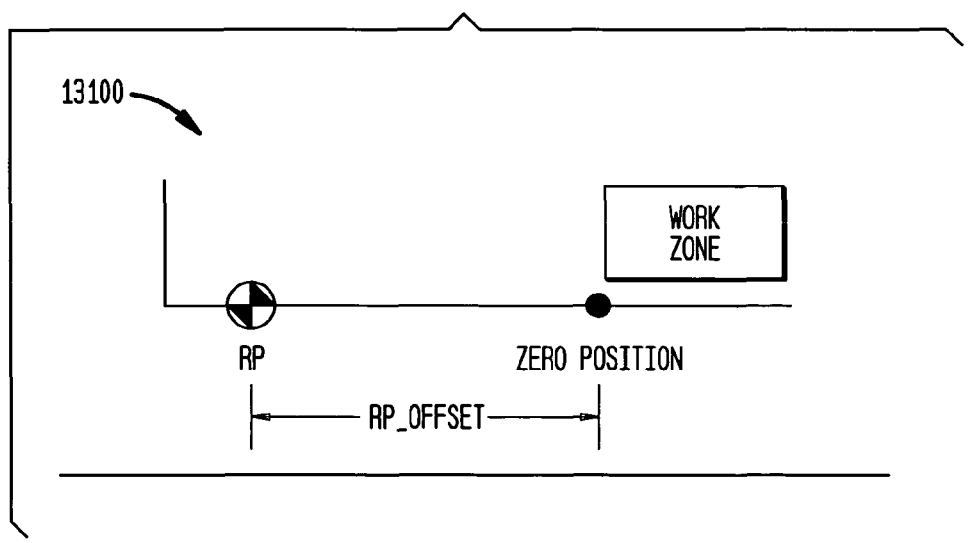
FIG. 13B is an exemplary embodiment of a relationship position versus zero position graph 13100 of the present invention.

Wizard 2030 provides advanced reference point options that enable a user to input an RP offset (RP_OFFSET), which is the distance from the RP to the zero position. As shown in FIG. 13B, an RP is identified by a method of locating an exact position with respect to the RPS. To configure the RP offset, a user inputs into the screen shown in FIG. 13A: RP_OFFSET, a distance from an RP to the zero position of a physical measuring system where default is equal to zero; and Backlash Compensation, a distance that a motor must move to eliminate slack (backlash) in a system on a direction change. It will be appreciated that Backlash compensation is always a positive value. It will be appreciated that the default is equal to zero. It will also be appreciated that wizard 2030 enables a user to skip this section.

Figure 14:
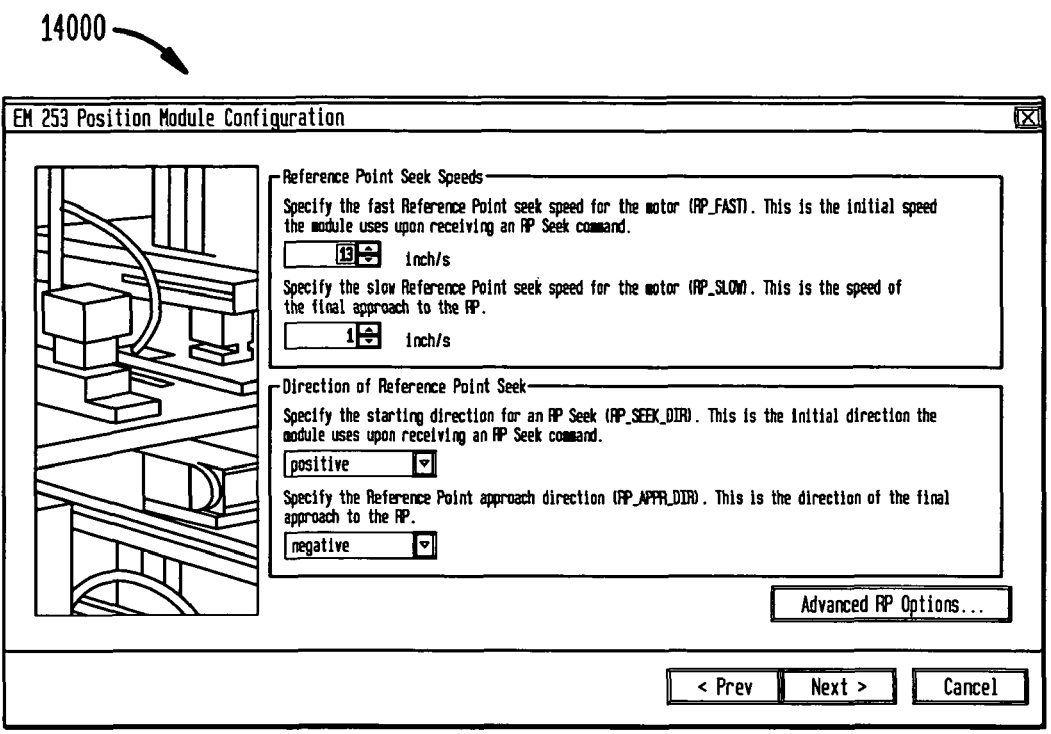
FIG. 14 is an exemplary embodiment of a position module configuration screen 14000 of the present invention.
Figure 15:
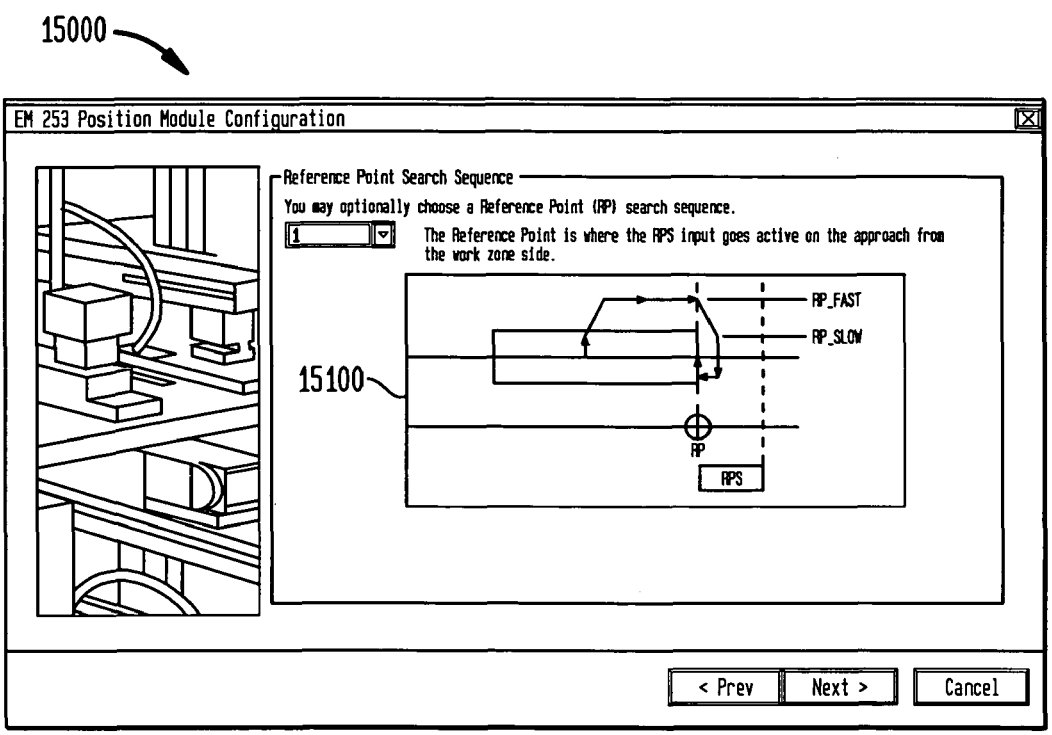
FIG. 15 is an exemplary embodiment of a position module configuration screen 15000 of the present invention.

FIG. 14 and FIG. 15 are each an exemplary embodiment of a corresponding position module configuration screen 14000 and 15000 of the present invention. If a user chooses to configure a reference point, these screens enable configuration of certain reference point parameters to "search" for the reference point. Wizard 2030 enables the configuration of a sequence that position module 2220 uses to search for a reference point. A user can select the following options for the RP search sequence including RP Seek mode 0: Does not perform a RP seek sequence; RP Seek mode 1: RP is where the RPS input goes active on the approach from the work zone side, the default; RP Seek mode 2: RP is centered within the active region of the RPS input; RP Seek mode 3; RP is located outside the active region of the RPS input, where RP_Z_CNT specifies how many ZP (Zero Pulse) input counts should be received after the RPS becomes inactive; and RP Seek mode 4: RP is generally within the active region of the RPS input. RP_ZCNT specifies how many ZP (Zero Pulse) input counts should be received after the RPS becomes active.

Figure 16:
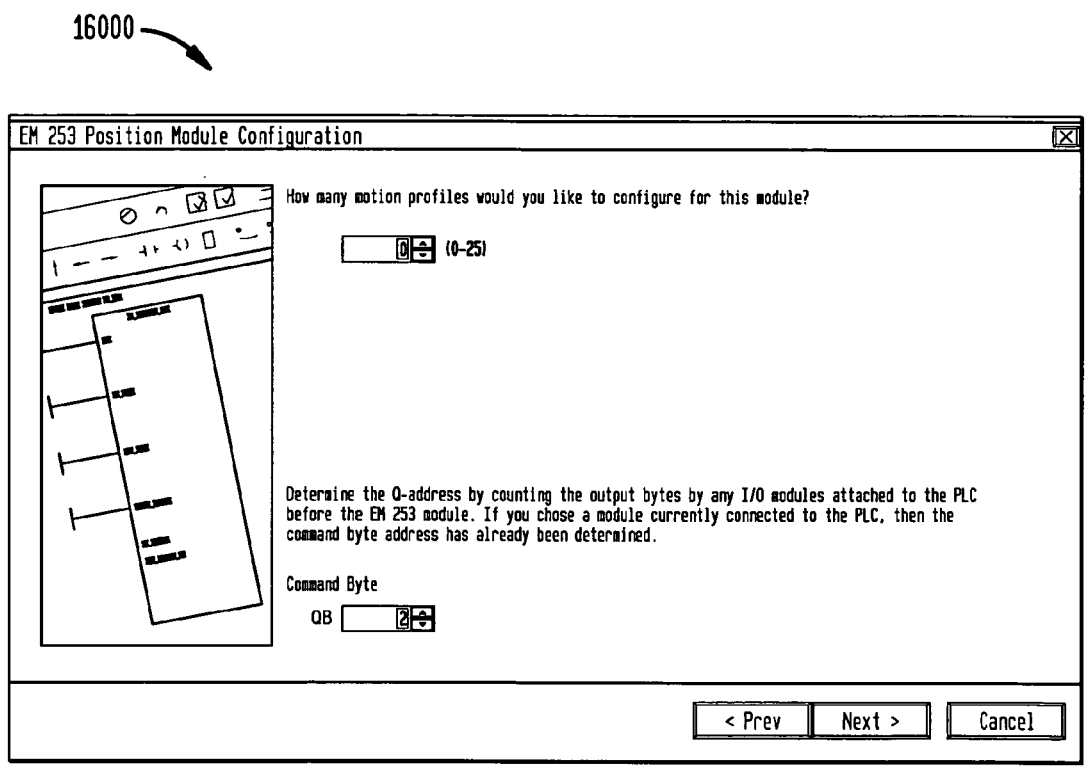
FIG. 16 is an exemplary embodiment of a position module configuration screen 16000 of the present invention.

FIG. 16 is an exemplary embodiment of a position module configuration screen 16000 of the present invention. It will be appreciated that a profile is a pre-defined motion description consisting of one or more speeds of movement that effect a movement from a starting point to an ending point. A user does not need to define a profile in order to use the module because wizard 2030 provides an instruction subroutine (POSx_GOTO) to control moves.

As shown, a user inputs the number of profiles, sequences of movement, up to a maximum of 25 profiles that should be configured for this module; an address for a command byte, the output (Q) memory address of the command byte for position module 2220; and an address for the configuration/profile table. It will be appreciated that a starting memory address for the configuration/profile table that stores the configuration data for position module 2220 and the data for all of the profiles. It will be further appreciated that in certain preferred embodiments, the configuration data for position module 2220 requires 92 bytes of V memory, and each profile requires 34 bytes of V memory. For example, the amount of memory required for a configuration/profile table for position module 2220 with one profile is 126 bytes of V memory. Position Control wizard 2030 can suggest an unused V memory block address of the correct size.

Figure 17A:
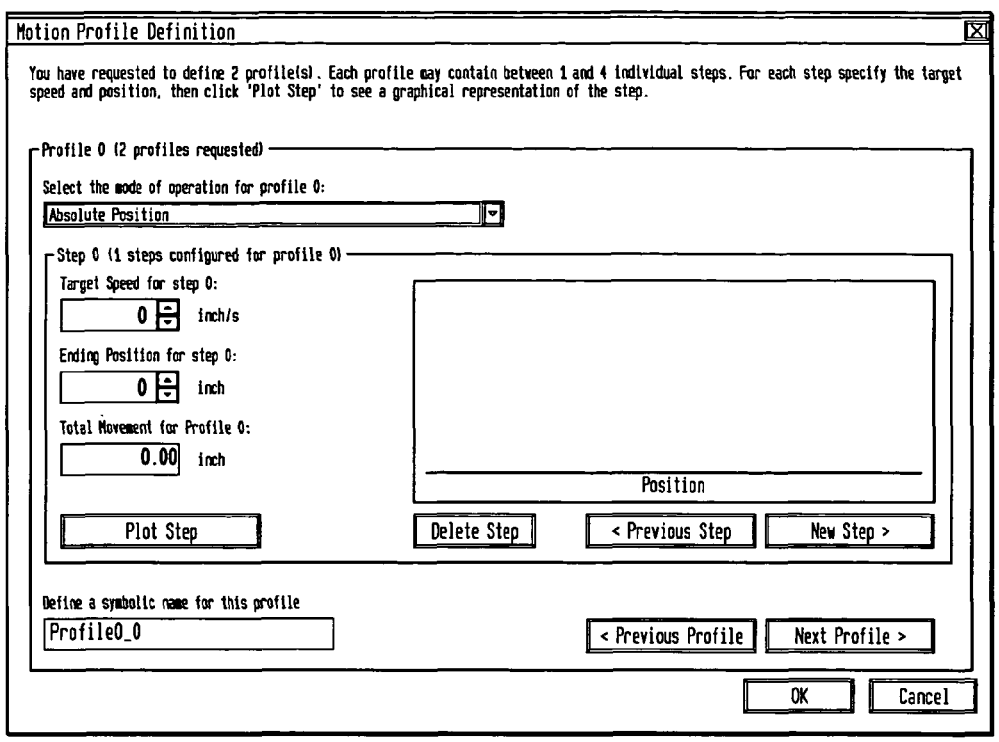
FIG. 17A is an exemplary embodiment of a motion profile definition screen 17000 of the present invention.

FIG. 17A is an exemplary embodiment of a motion profile definition screen 17000 of the present invention. This screen enables a user to define a sequence of movements, and provide an initial graphical representation of a profile. As shown, wizard 2030 provides a Motion Profile Definition where a motion profile is defined for an application. For each profile, a user inputs an operating mode and defines the specifics of each individual step for the profile. Wizard 2030 enables a user to define a symbolic name for each profile by simply entering a symbol name as the profile is defined. After a user completes data input to configure a profile, wizard 2030 enables a user to save and print a copy of the profile parameters.

Figure 17B:
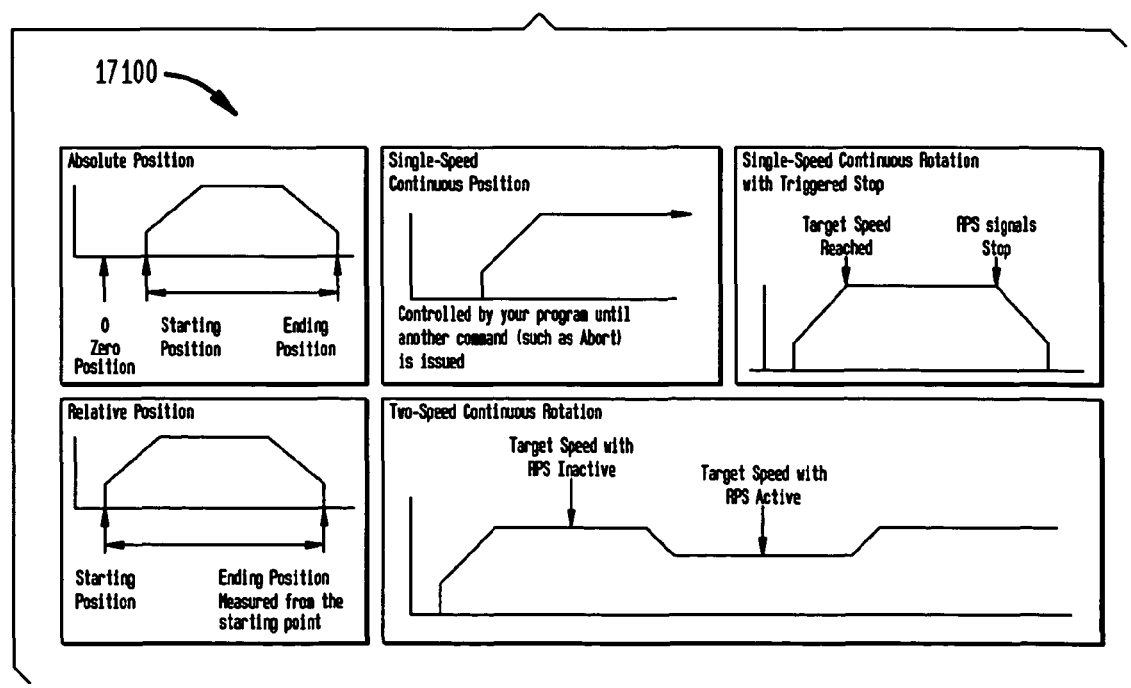
FIG. 17B is an exemplary embodiment of mode selections for a position module 17100 of the present invention.

FIG. 17B is an exemplary embodiment of mode selections for a position module 17100 of the present invention. As shown, Wizard 2030 enables a user to configure a profile according to a mode of operation, either an absolute position, a relative position, a single-speed continuous rotation, or a two-speed continuous rotation.

It will be appreciated that a step is a fixed distance that a tool moves, including the distance covered during acceleration and deceleration times. Each profile can have up to 4 individual steps. A user inputs into the wizard screen of FIG. 17A a target speed and ending position for each step. If there is more than one step, a user clicks a New Step button and enters information for each step of the profile. Four exemplary profiles include a one-step, a two-step, a three-step and a four-step profile. By clicking a Plot Step button, a user can view a graphical representation of the step, as calculated by 2030. It will be appreciated that this feature enables a user to easily and interactively review and edit each step.

Figure 18:
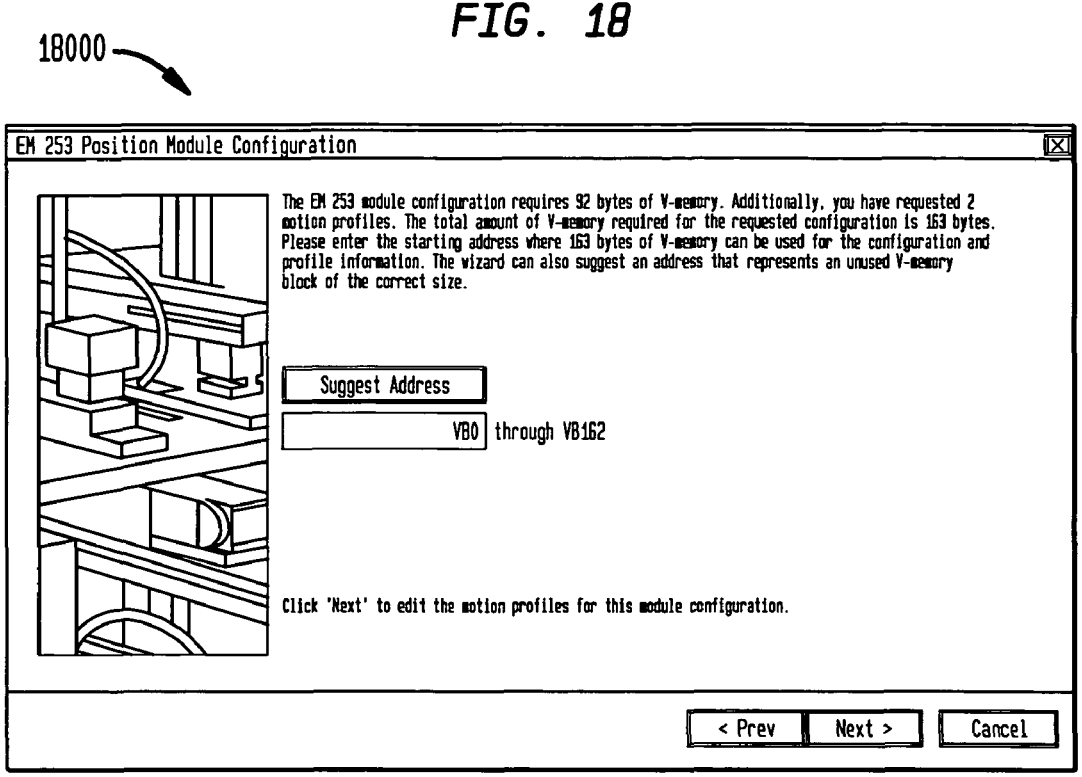
FIG. 18 is an exemplary embodiment of a position module configuration screen 18000 of the present invention.

FIG. 18 is an exemplary embodiment of a position module configuration screen 18000 of the present invention. It will be appreciated that the configurations of position module 2220 are stored in the V-Memory of PLC 2080. As shown, wizard 2030 reviews the user's program and suggests an address that will not conflict with the programs V-memory usage.

Figure 19:
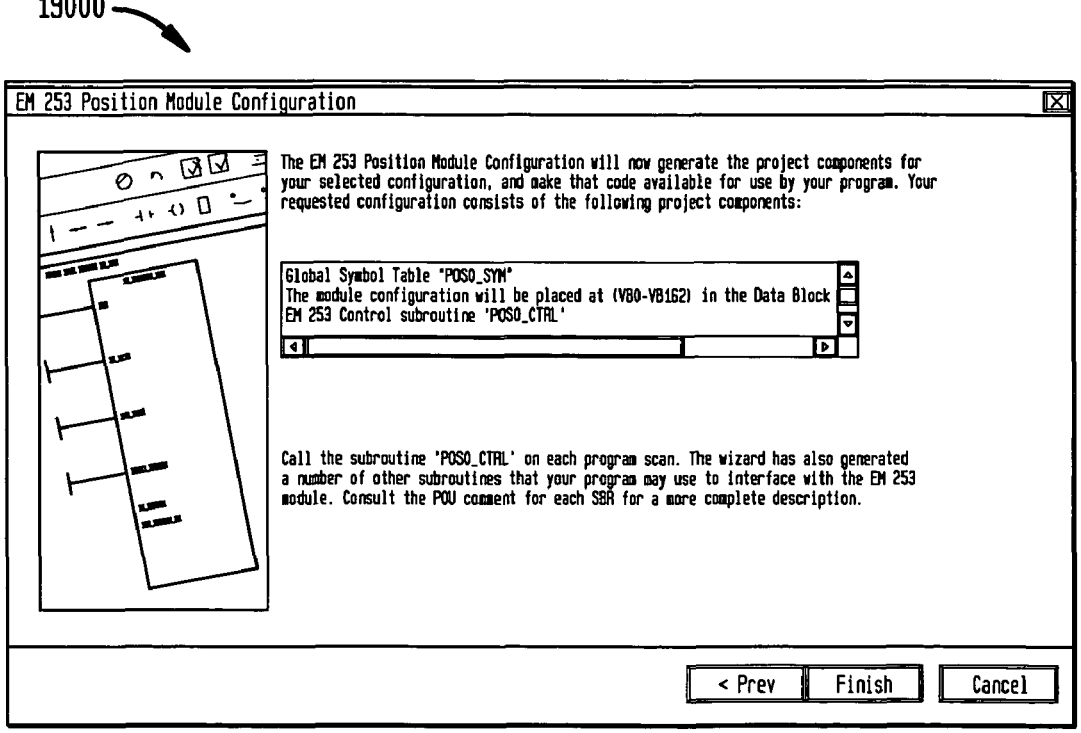
FIG. 19 is an exemplary embodiment of a position module configuration screen 19000 of the present invention.

FIG. 19 is an exemplary embodiment of a position module configuration screen 19000 of the present invention. As shown, FIG. 19 is a completion screen that provides a summary of the project components including data, instructions and programming that will be added to a user's project as a result of wizards output 2040. Position Control wizard 2030 inserts a module configuration and profile table into data block 2140 for the program of PLC 2080. Wizard 2030 also creates a global symbol table for the motion parameters and adds motion instruction subroutines into project program block 2150 that is provided for the user's application. This screen also provides a description of the next steps required to complete this process.

Figure 20:
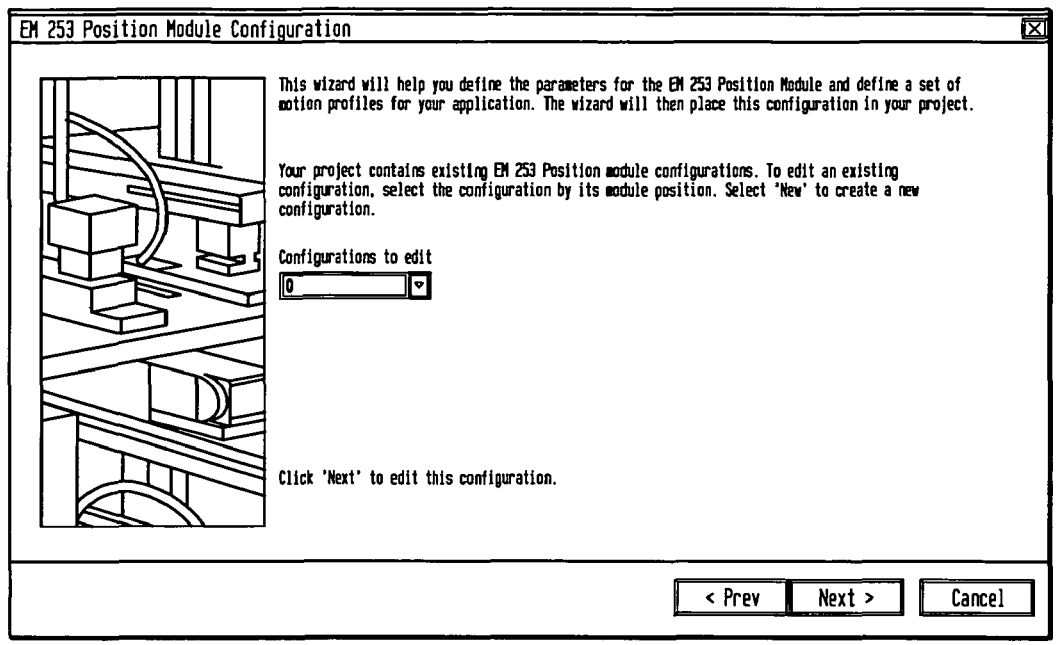
FIG. 20 is an exemplary embodiment of a position module configuration screen 20000 of the present invention.

FIG. 20 is an exemplary embodiment of a position module configuration screen 20000 of the present invention. As shown, this screen first appears when a user's project already contains one ore more wizard generated configurations. It enables a user to choose between re-editing an existing wizard generated configuration or creating a new, additional configuration.

Figure 21:
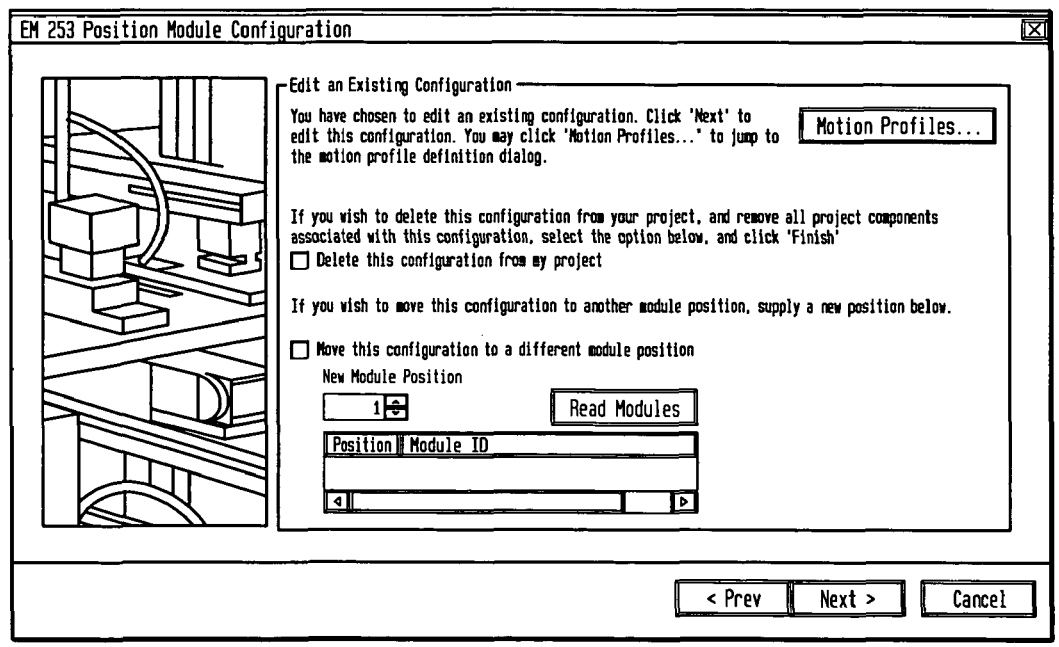
FIG. 21 is an exemplary embodiment of a motion profile definition screen 21000 of the present invention.

FIG. 21 is an exemplary embodiment of a motion profile definition screen 21000 of the present invention. If a user chooses to edit an existing wizard generated configuration, this screen enables a user to proceed. As shown, a user may delete an existing configuration from the project. Selection of this option will cause all of the project components for this wizard generated configuration to be removed from the user's specified project. A user may move the configuration to a different module position. If selected, wizard 2030 automatically moves the configurations to another module position. If a user selects "Next" without selecting either available option, a user will initiate a re-edit wizard process to change current parameters.

It will be appreciated that the ability to modify wizard configurations by re-executing the wizard facilitates the constant maintenance and modifications typically required of motion devices.

Wizard 2030 facilitates control of position module 2220 by creating unique instruction subroutines based on a position of the module and configuration options a user inputs. Each position instruction is prefixed with a "POSx_" where x is the module location. Because each position instruction is a subroutine, the 11 position instructions use 11 subroutines.

A POSx_RUN and POSx_GOTO instruction can be executed from an interrupt routine. If an instruction is initiated in an interrupt routine, then the outputs of the POSx_CTRL instruction are used to monitor when the Position module has completed the movement.

Position Control wizard 2220 automatically configures values for speed parameters (Speed and C_Speed) and position parameters (Pos or C_Pos) according to the measurement system that a user selected. For pulses, these parameters are DINT values. For engineering units, the parameters are REAL values for the type of unit that you selected. For example: selecting centimeters (cm) stores the position parameters as REAL values in centimeters and stores the speed parameters as REAL values in centimeters per second (cm/sec).

Instructions generated by Position Control wizard are provided herein below.

FIG. 22 is a block diagram of an exemplary function block 22000 of the present invention. As shown, POSx_CTRL instruction (Control) enables and initializes Position module 2220 by automatically commanding it to load the configuration/profile table each time PLC 2080 changes to RUN mode.

This instruction should preferably be used once in a project, and should be preferably called for every scan.

The parameters for POSx_CTRL Instruction are shown below in Table 2. In certain embodiments, SMO.O (Always On) is used as the input for the EN parameter. The EN parameter must be on to enable the other position instructions to send commands to Position module 2220. If the EN parameter turns off, then Position module 2220 aborts any command that is in progress. The output parameters of the POSx_CTRL instruction provide the current status of Position module 2220. The Done parameter turns on when the Position module completes any instruction. The Error parameter contains the result of this instruction.

The CPos parameter is the current position of the module. Based of the units of measurement, the value is either a number of pulses (DINT) or the number of engineering units (REAL). The C_Speed parameter provides the current speed of the module. If you configured the measurement system for the Position module for pulses, C_Speed is a DINT value containing the number of pulses/second. If you configured the measurement system for engineering units, C_Speed is a REAL value containing the selected engineering units/second (REAL). The C_Dir parameter indicates the current direction of the motor.

TABLE 2

Parameters for the POSx_CTRL Instruction

| Inputs/Outputs | Data Type | Operands |
|---|---|---|
| MOD_EN | BOOL | I, Q, V, M, SM, S, T, C, L, Power Flow |
| Done, C_Dir | BOOL | I, Q, V, M, SM, S, T, C, L |
| Error | BYTE | IB, QB, VB, MB, SMB, SB, LB, AC, *VD, *AC, *LD |
| C_Pos, C_Speed | DINT, REAL | ID, QD, VD, MD, SMD, SD, LD, AC, *VD, *AC, *LD |

FIG. 23 is a block diagram of an exemplary function block 23000 of the present invention. As shown, the POSx_MAN instruction (Manual Mode) places position module 2220 into manual mode. This allows the motor to be run at different speeds or to be jogged in a positive or negative direction.

While the POSx_MAN instruction is enabled, only the POSx_CTRL and POSx_DIS instructions are allowed.

In certain exemplary embodiments, only one of the RUN, JOG_P, or JOG N inputs is enabled at a time. Enabling the RUN (Run/Stop) parameter commands the Position module to accelerate to the specified speed (Speed parameter) and direction (Dir parameter). The value for the Speed parameter can be changed while the motor is running, but the Dir parameter must remain constant. Disabling the RUN parameter commands the Position module to decelerate until the motor comes to a stop.

Enabling the JOG_P (Jog Positive Rotation) or the JOG_N (Jog Negative Rotation) parameter commands the Position module to jog in either a positive or negative direction. If the JOG_P or JOG N parameter remains enabled for less than 0.5 seconds, Position module 2220 issues pulses to travel the distance specified in JOG_INCREMENT. If the JOG_P or JOG_N parameter remains enabled for 0.5 seconds or longer, the motion module begins to accelerate to the specified JOG_SPEED.

The Speed parameter determines the speed when RUN is enabled. If the measuring system of position module 2220 is measured for pulses, the speed is a DINT value for pulses/second. If the measuring system is configured of the Position module for engineering units the speed is a REAL value for units/second. This parameter can be changed while the motor is running.

The Dir parameter determines the direction to move when RUN is enabled. You cannot change this value when the RUN parameter is enabled. The Error parameter contains the result of this instruction. The C_Pos parameter contains the current position of the module. Based of the units of measurement selected, the value is either a number of pulses (DINT) or the number of engineering units (REAL). The C_Speed parameter contains the current speed of the module. Based of the units of measurement selected, the value is either the number of pulses/second (DINT) or the engineering units/second (REAL). The C_Dir parameter indicates the current direction of the motor.

TABLE 3

Parameters for the POSx_MAN Instruction

| Inputs/Outputs | Data Type | Operands |
| --- | --- | --- |
| RUN, JOG_P, JOG_N | BOOL | I, Q, V, M, SM, S, T, C, L, Power Flow |
| Speed | DINT, REAL | ID, QD, VD, MD, SMD, SD, LD, AC, *VD, *AC, *LD, Constant |
| Dir, C_Dir | BOOL | I, Q, V, M, SM, S, T, C, L |
| Error | BYTE | IB, QB, VB, MB, SMB, SB, LB, AC, *VD, *AC, *LD |
| C_Pos, C_Speed | DINT, REAL | ID, QD, VD, MD, SMD, SD, LD, AC, *VD, *AC, *LD |

FIG. 24 is a block diagram of an exemplary function block 24000 of the present invention. A POSx_GOTO instruction commands position module 2220 to go to a desired location. Turning on the EN bit enables the instruction. Turning on the START parameter sends a GOTO command to Position module 2220. For each scan, when the START parameter is on and the Position module is not currently busy, the instruction sends a GOTO command to position module 2220. To ensure that only one GOTO command is sent and an edge detection element is used to pulse the START parameter on.

A Pos parameter contains a value that signifies either the location to move (for an absolute move) or the distance to move (for a relative move). Based on the units of measurement selected, the value is either a number of pulses (DINT) or the engineering units (REAL).

A Speed parameter determines a maximum speed for this movement. Based on the units of measurement, the value is either a number of pulses/second (DINT) or an engineering units/second (REAL).

A Mode parameter selects the type of movement:
0—Absolute position
1—Relative position
2—Single-speed, continuous positive rotation
3—Single-speed, continuous negative rotation A Done parameter turns on when the Position module completes this instruction.

An Error parameter contains the result of this instruction. A C_Pos parameter contains current position of the module. Based on the units of measurement, the value is either a number of pulses (DINT) or the number of engineering units (REAL). The C_Speed parameter contains the current speed of the module. Based on the units of measurement, the value is either a number of pulses/second (DINT) or an engineering units/second (REAL).

TABLE 4

Parameters for the POSx_GOTO Instruction

| Inputs/Outputs | Data Type | Operands |
| --- | --- | --- |
| START | BOOL | I, Q, V, M, SM, S, T, C, L, Power Flow |
| Pos, Speed | DINT, REAL | ID, QD, VD, MD, SMD, SD, LD, AC, *VD, *AC, *LD, Constant |
| Mode | BYTE | IB, QB, VB, MB, SMB, SB, LB, AC, *VD, *LD, Constant |
| Abort, Done | BOOL | I, Q, V, M, SM, S, T, C, L |
| Error | BYTE | IB, QB, VB, MB, SMB, SB, LB, AC, *VD, *AC, *LD |
| C_Pos, C_Speed | DINT, REAL | ID, QD, VD, MD, SMD, SD, LD, AC, *VD, *AC, *LD |

FIG. 25 is a block diagram of an exemplary function block 25000 of the present invention. A POSx_RUN instruction (Run Profile) commands a position module 2220 to execute a motion operation in a specific profile stored in a configuration/profile table. Turning on an EN bit enables the instruction. Turning on a START parameter sends a RUN command to a Profile Done Position module. For each scan when the START parameter is on and position module 2220 is not currently busy, an instruction sends a RUN command to position module 2220. To ensure that only one command is sent, use an edge detection element to pulse the START parameter on. The Profile parameter contains the number or the symbolic name for the motion profile.

Turning on the Abort parameter commands to Position module 2220 to stop the current profile and decelerate until the motor comes to a stop. The Done parameter turns on when the module completes this instruction. The Error parameter contains the result of this instruction.

The C_Profile parameter contains the profile currently being executed by position module 2220. The C_Step parameter contains the step of the profile currently being executed. The C_Pos parameter contains the current position of the module. Based of the units of measurement, the value is either a number of pulses (DINT) or the number of engineering units (REAL). The C_Speed parameter contains the current speed of the module. Based of the units of measurement, the value is either a number of pulses/second (DINT) or the engineering units/second (REAL).

TABLE 5

Parameters for the POSx_RUN Instruction

| Inputs/Outputs | Data Type | Operands |
|---|---|---|
| START | BOOL | I, Q, V, M, SM, S, T, C, L, Power Flow |
| Profile | BYTE | IB, QB, VB, MB, SMB, SB, LB, AC, *VD, *AC, *LD, Constant |
| Abort, Done | BOOL | I, Q, V, M, SM, S, T, C, L |
| Error, C_Profile, C_Step | BYTE | IB, QB, VB, MB, SMB, SB, LB, AC, *VD, *AC, *LD |
| C_Pos, C_Speed | DINT, REAL | ID, QD, VD, MD, SMD, SD, LD, AC, *VD, *AC, *LD |

FIG. 26 is a block diagram of an exemplary function block 2600 of the present invention. A POSx_RSEEK instruction (Seek Reference Point Position) initiates a reference point seek operation, using the search method in the configuration/profile table. When position module 2220 locates a reference point and motion has stopped, position module 2220 loads an RP_OFFSET parameter value into the current position and generates a 50-millisecond pulse on the CLR output.

The default value for RP_OFFSET is 0. Wizard 2030, EM253 Control Panel, or the POSx_LDOFF (Load Offset) instruction can be used to change the RP_OFFSET value Turning on the EN bit enables the instruction.

Turning on a START parameter sends a RSEEK command to position module 2220. For each scan when the START parameter is on and position module 2220 is not currently busy, an instruction sends a RSEEK command to position module 2220. To ensure that only one command is sent, use an edge detection element to pulse the START parameter on.

A Done parameter turns on when the module completes this instruction. An Error parameter contains the result of this instruction.

TABLE 6

Parameters for the POSx_RSEEK Instruction

| Inputs/Outputs | Data Type | Operands |
|---|---|---|
| START | BOOL | I, Q, V, M, SM, S, T, C, L, Power Flow |
| Done | BOOL | I, Q, V, M, SM, S, T, C, L |
| Error | BYTE | IB, QB, VB, MB, SMB, SB, LB, AC, *VD, *AC, *LD |

FIG. 27 is a block diagram of an exemplary function block 27000 of the present invention. The POSx LDOFF instruction (Load Reference Point Offset) establishes a new zero position that is at a different location from a reference point position.

Before executing this instruction, the position of the reference point is first determined and the machine is to be moved to the starting position. When the instruction sends the LDOFF command, position module 2220 computes an offset between the starting position (the current position) and the reference point position. Position module 2220 then stores the computed offset to an RPOFFSET parameter and sets a current position to 0. This establishes the starting position as the zero position. In the event that a motor loses track of its position (due to loss of power or if the motor is manually repositioned), a POSx_RSEEK instruction re-establishes a zero position automatically.

Turning on the EN bit enables the instruction. Turning on the START parameter sends an LDOFF command to position module 2220. For each scan when a START parameter is on and position module 2220 is not currently busy, the instruction sends an LDOFF command to position module 2220. To ensure that only one command is sent, use an edge detection element to pulse the START parameter on. A Done parameter turns on when the module completes this instruction. An Error parameter contains the result of this instruction.

TABLE 7

Parameters for the POSx_LDOFF Instruction

| Inputs/Outputs | Data Type | Operands |
|---|---|---|
| START | BOOL | I, Q, V, M, SM, S, T, C, L, Power Flow |
| Done | BOOL | I, Q, V, M, SM, S, T, C, L |
| Error | BYTE | IB, QB, VB, MB, SMB, SB, LB, AC, *VD, *AC, *LD |

FIG. 28 is a block diagram of an exemplary function block 28000 of the present invention. A POSx_LDPOS instruction (Load Position) changes a current position value in position module 2220 to a new value. This instruction can also be used to establish a new zero position for any absolute move command.

Turning on an EN bit enables the instruction. Turning on a START parameter sends a LDPOS command to position module 2220. For each scan when the START parameter is on and position module 2220 is not currently busy, the instruction sends an LDPOS command to position module 2220. To ensure that only one command is sent, use an edge detection element to pulse the START parameter on.

A New_Pos parameter provides a new value to replace the current position value that position module 2220 reports and uses for absolute moves. Based of the units of measurement, a value is either a number of pulses (DINT) or the engineering units (REAL).

A Done parameter turns on when the module completes this instruction. An Error parameter contains the result of this instruction. A C_Pos parameter contains the current position of the module. Based of the units of measurement, the value is either a number of pulses (DINT) or the number of engineering units (REAL).

TABLE 8

Parameters for the POSx_LDPOS Instruction

| Inputs/Outputs | Data Type | Operands |
|---|---|---|
| START | BOOL | I, Q, V, M, SM, S, T, C, L, Power Flow |
| New_Pos, C_Pos | DINT, REAL | ID, QD, VD, MD, SMD, SD, LD, AC, *VD, *AC, *LD |
| Done | BOOL | I, Q, V, M, SM, S, T, C, L |
| Error | BYTE | IB, QB, VB, MB, SMB, SB, LB, AC, *VD, *AC, *LD |

FIG. 29 is a block diagram of an exemplary function block 29000 of the present invention. A POSx_SRATE instruction (Set Rate) commands position module 2220 to change the acceleration, deceleration, and jerk times. Turning on an EN bit enables the instruction. Turning on a START parameter copies the new time values to a configuration/profile table and sends an SRATE command to position module 2220. For each scan, when the START parameter is on and the Position-module is not currently busy, the instruction sends an SRATE command to position module 2220. To ensure that only one command is sent, use an edge detection element to pulse a START parameter on. The ACCEL_Time, DECEL_Time, and JERK_Time parameters determine the new acceleration time, deceleration time, and jerk time in milliseconds (ms).

A Done parameter turns on when the module completes this instruction. The Error parameter contains the result of this instruction.

TABLE 9

Parameters for the POSx_SRATE Instruction

| Inputs/Outputs | Data Type | Operands |
|---|---|---|
| START | BOOL | I, Q, V, M, SM, S, T, C, L |
| ACCEL_Time, DECEL_Time, JERK_Time | DINT | ID, QD, VD, MD, SMD, SD, LD, AC, *VD, *AC, *LD, Constant |
| Done | BOOL | I, Q, V, M, SM, S, T, C, L |
| Error | BYTE | IB, QB, VB, MB, SMB, SB, LB, AC, *VD, *AC, *LD |

Figure 30:
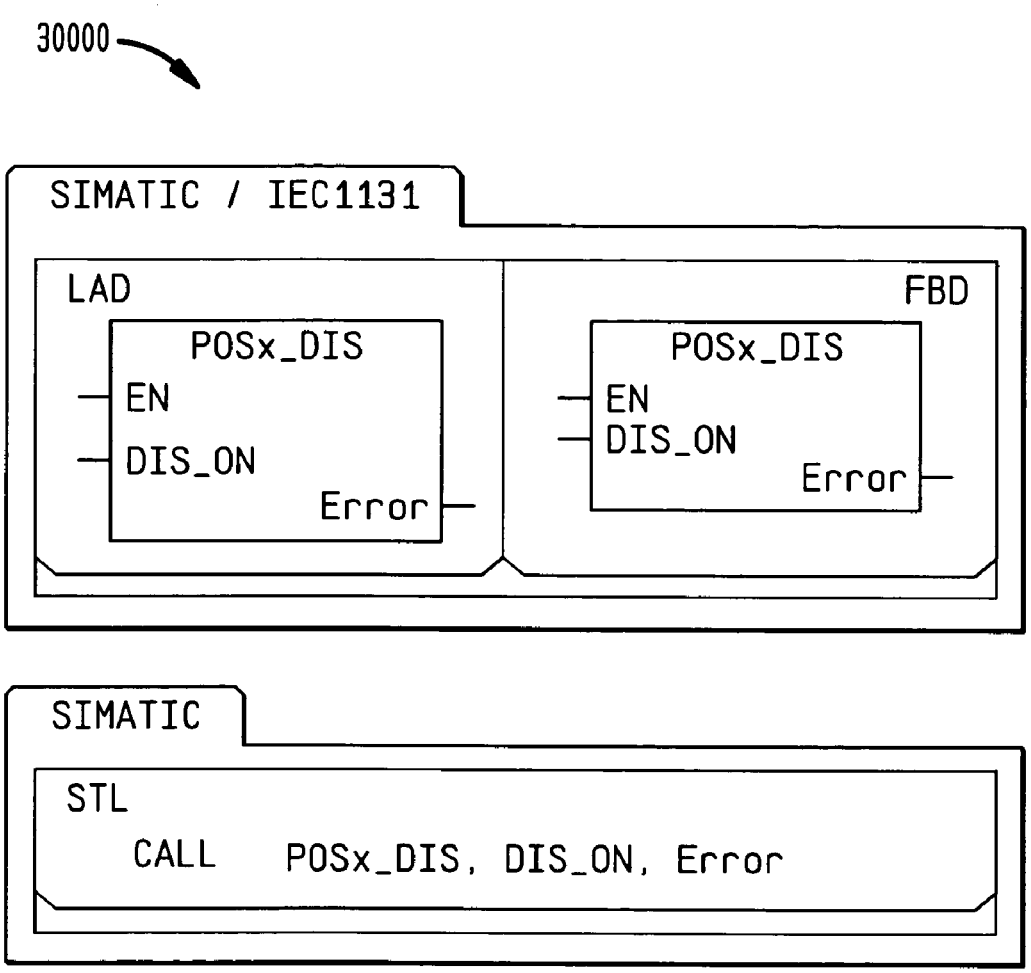
FIG. 30 is a block diagram of an exemplary function block 30000 of the present invention.

FIG. 30 is a block diagram of an exemplary function block 30000 of the present invention. A POSx_DIS instruction turns the DIS output of position module 2220 on or off. This enables use of the DIS output for disabling or enabling a motor controller. If the DIS output is used on position module 2220, then this instruction can be called at every scan or only when there is a requirement to change the value of the DIS output.

It will be appreciated that when an EN bit turns on to enable the instruction, the DIS_ON parameter controls the DIS output of the Position module. An Error parameter contains the result of this instruction.

TABLE 10

Parameters for the POSx_DIS Instruction

| Inputs/Outputs | Data Type | Operands |
|---|---|---|
| DIS_ON | BYTE | IB, QB, VB, MB, SMB, SB, LB, AC, *VD, *AC, *LD, Constant |
| Error | BYTE | IB, QB, VB, MB, SMB, SB, LB, AC, *VD, *AC, *LD |

FIG. 31 is a block diagram of an exemplary function block 31000 of the present invention. A POSx_CLR instruction (Pulse the CLR Output) commands position module 2220 to generate a 50-ms pulse on a CLR output. Turning on an EN bit enables the instruction. Turning on the START parameter sends a CLR command to position module 2220. For each scan when the START parameter is on and the Position module is not currently busy, the instruction sends a CLR command to position module 2220. To ensure that only one command is sent, use an edge detection element to pulse a START parameter on.

A Done parameter turns on when the module completes this instruction. An Error parameter contains the result of this instruction.

TABLE 11

Parameters for the POSx_CLR Instruction

| Inputs/Outputs | Data Type | Operands |
|---|---|---|
| START | BOOL | I, Q, V, M, SM, S, T, C, L, Power Flow |
| Done | BOOL | I, Q, V, M, SM, S, T, C, L |
| Error | BYTE | IB, QB, VB, MB, SMB, SB, LB, AC, *VD *AC, *LD |

FIG. 32 is a block diagram of an exemplary function block 32000 of the present invention. A POSx_CFG instruction (Reload Configuration) commands position module 2220 to read the configuration block from the location specified by the configuration/profile table pointer. Position module 2220 then compares a new configuration with the existing configuration and performs any required setup changes or recalculations.

Turning on an EN bit enables the instruction. Turning on the START parameter sends a CFG command to position module 2220. For each scan when a START parameter is on and position module 2220 is not currently busy, the instruction sends a CFG command to position module 2220. To ensure that only one command is sent, use an edge detection element to pulse the START parameter on. A Done parameter turns on when the module completes this instruction. An Error parameter contains a result of this instruction.

TABLE 9-12

Parameters for the POSx_CFG Instruction

| Inputs/Outputs | Data Type | Operands |
|---|---|---|
| START | BOOL | I, Q, V, M, SM, S, T, C, L, Power Flow |
| Done | BOOL | I, Q, V, M, SM, S, T, C, L |
| Error | BYTE | IB, QB, VB, MB, SMB, SB, LB, AC, *VD *AC, *LD |

Figure 33:
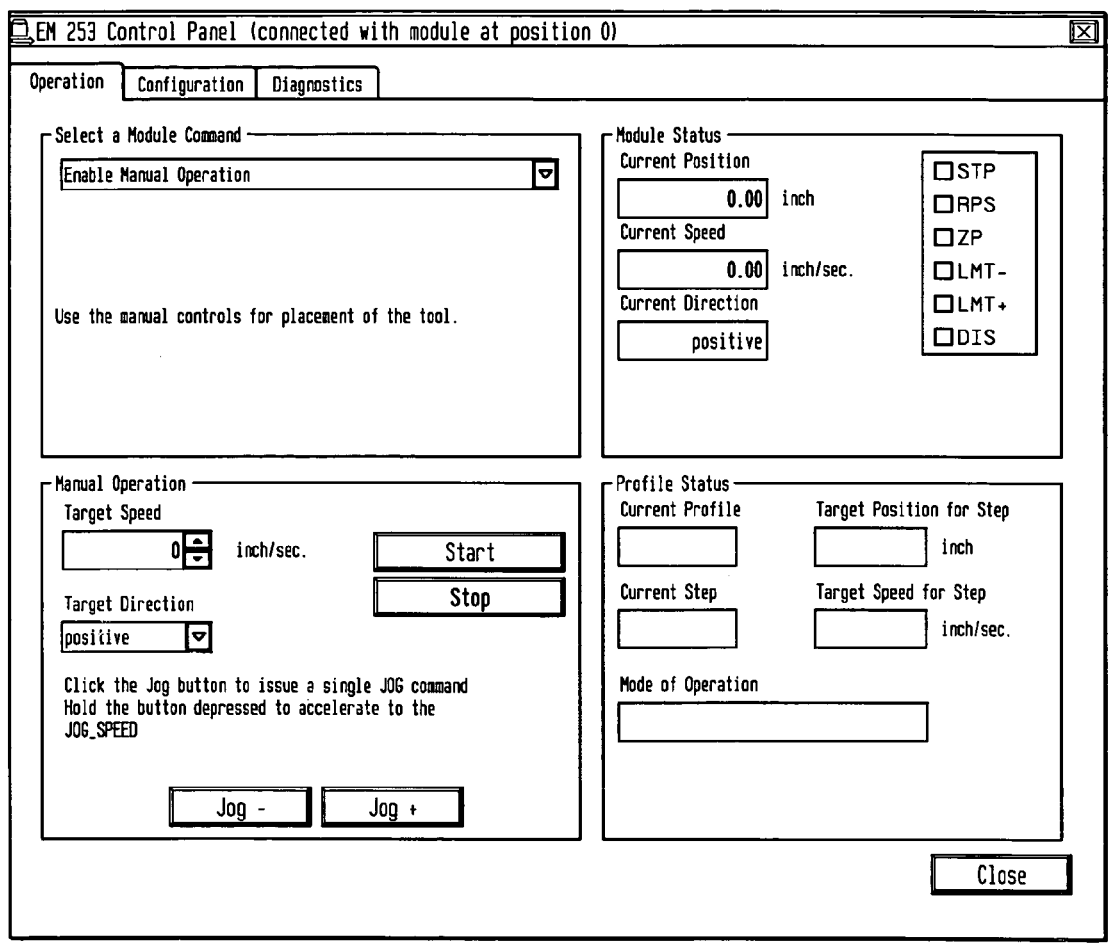
FIG. 33 is a screen of an exemplary operational control panel 33000 of the present invention.

FIG. 33 is a screen of an exemplary operational control panel 33000 of the present invention. As shown, program operating system 2020 (e.g. STEP 7-Micro/WIN), provides an EM 253 Control Panel. The Operation, Configuration and Diagnostics tabs facilitates monitoring and control of the operation of a position module 2220 during the startup and test phases of a position module development process.

The EM 253 Control Panel shown in FIG. 33, can be used to verify that a position module 2220 is wired correctly, to adjust the configuration data, and to test each movement profile. The Operation tab of the control panel enables user to interact with the operations of position Module 2220. The control panel displays a current speed, a current position and a current direction of position module 2220. A user can also monitor a status of the input and output LEDs (excluding Pulse LEDs). The control panel also enables a user to interact with position module 2220 by changing the speed and direction, stopping and starting of the motion, and jogging the tool (if the motion is stopped).

A user can also generate motion commands. U Enable Manual Operation command provides use of manual controls for positioning a tool. Run a Motion Profile command selects a profile to be executed. The control panel displays the status of the profile which is being executed by position module 2220. Seek to a Reference Point command finds the reference point by using a configured search mode. Load Reference Point Offset command provides use of manual controls to jog a tool to a new zero position, and then to load a Reference Point Offset. Reload Current Position command updates of a current position value and to establish a new zero position. Activate the DIS output and Deactivate the DIS output commands turn a DIS output of position module 2220 on and off. Pulse the CLR output command generates a 50 ms pulse on the CLR output of position module 2220. Teach a Motion Profile command saves a target position and speed for a motion profile and step as a tool is manually positioned.

It will be appreciated that the control panel displays the status of the profile which is being executed by the Position module.

There are additional commands provided by the EM 252 control panel. Load Module Configuration command loads a new configuration by commanding position module 2220 to read a configuration block from the V memory of PLC 2080 (e.g., S7-200). J Move to an Absolute Position command enables a move to a specified position at a target speed. Before using this command, the zero position must already be established. Move by a Relative Amount enables a move of a specified distance from the current position at a target speed. A user can input a positive or negative distance.

U Reset the Command Interface command clears a command byte for position module 2220 and sets a Done bit. This command is used if position module 2220 appears to not respond to commands.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. For example, programming of the position module can occur over the Internet. Likewise, transmission of the pulse train can occur over the Internet. References specifically identified and discussed herein are incorporated by reference as if fully set forth herein. Accordingly, the drawings and descriptions are to be regarded as illustrative in nature, and not as restrictive.

What is claimed is:

1. A method for configuring a programmable logic controller, comprising:
    initiating a wizard at a computer when the computer is not communicatively coupled to the programmable logic controller, the wizard adapted for:
        determining when the programmable logic controller is communicatively coupled to the computer;
        retrieving parameter data from the programmable logic controller for an application of the programmable logic controller in response to determining that the programmable logic controller is communicatively coupled to the computer;
        automatically range checking the parameter data;
        pre-loading, through the wizard, one or more options for a configuration of the application of the programmable logic controller based on position parameter data retrieved from the programmable logic controller;
        querying for a plurality of answers regarding the application of the programmable logic controller; and
        based on the position parameter data retrieved, the pre-loaded one or more options, and the answers, generating at least one configuration adapted to configure a position module and at least one set of instructions executable by the programmable logic controller, the position module distinct from, and communicatively connected to the programmable logic controller, the position module adapted to generate a pulse train, the pulse train adapted to control motion of at least one of a stepper drive, servo drive, stepper motor, servomotor, linear motor, motor, ball screw, servo valve, hydraulic actuator, and pneumatic valve based on the at least one configuration, the pulse train generated responsive to an output polarity of the pulse train provided by a user via the wizard.

2. The method of claim 1 further comprising selecting from one of editing an existing configuration adapted to configure position module and creating a new configuration adapted to configure the position module, a module position of the position module automatically read via the wizard.

3. The method of claim 1, further comprising determining if the at, least one configuration adapted to configure the position module is compatible with a project.

4. The method of claim 3, wherein if the configuration is not compatible generating an error report.

5. The method of claim 1, further comprising receiving answers to the querying, the plurality of answers comprising a user-specified delay time, the pulse train generated responsive to the user-specified delay time.

6. The method of claim 1, further comprising generating a profile program table.

7. The method of claim 1, further comprising generating position instructions.

8. The method of claim 1, further comprising reviewing instructions.

9. The method of claim 8, further comprising testing execution of the instructions on the position module.

10. The method of claim 7, further comprising updating a program with the instructions for providing the pulse train.

11. The method of claim 10, further comprising controlling at least one of the stepper drive, servomotor, linear motor, motor, ball screw, servo valve, hydraulic actuator, and pneumatic valve based on the pulse train.

12. A method for configuring a position module, comprising: initiating a wizard at a computer when the computer is not communicatively coupled to the programmable logic controller, the wizard adapted for:
    determining when a programmable logic controller is communicatively coupled to the computer;
    retrieving parameter data from the programmable logic controller in response to determining that the programmable logic controller is communicatively coupled to the computer;
    automatically range checking the parameter data;
    pre-loading, through the wizard, one or more options for a configuration of the position module based on position parameter data retrieved from the programmable logic controller;
    querying for a plurality of motion answers;
    generating at least one configuration based on the position parameter data retrieved, the pre-loaded one or more options, and the motion answers, the at least one configuration adapted to configure the position module, the position module adapted to generate a pulse train, the pulse train adapted to control motion of at least one of a stepper drive, servo drive, stepper motor, servomotor, linear motor, motor, ball screw, servo valve, hydraulic actuator, and pneumatic valve based on the at least one configuration, the pulse train generated responsive to an output polarity of the pulse train provided by a user via the wizard; and
    storing the at least one configuration in a predetermined storage location of a memory of the programmable logic controller, the predetermined storage location selected to avoid conflicts with a user program executable via the programmable logic controller.

13. A system, comprising:
    a wizard adapted to configure a position module, the wizard adapted to determine when a programmable logic controller is communicatively coupled to a computer, to retrieve parameter data from the programmable logic controller in response to determining that the programmable logic controller is communicatively coupled to the computer, to range check the parameter data, and to pre-load, through the wizard, one or more options for configuring the position module based on position parameter data retrieved from the programmable logic controller;
    querying for a plurality of answers regarding an application of the programmable logic controller; and
    based on the position parameter data retrieve, the pre-loaded one or more options, and the answers, generating at least one configuration adapted to configure a position module and at least one set of instructions executed by the programmable logic controller, a position module distinct from, and communicatively connected to, a programmable logic controller, the position module adapted to generate a pulse train, the pulse train adapted to control motion of at least one of a stepper drive, servo drive, stepper motor, servomotor, linear motor, motor, ball screw, servo valve, hydraulic actuator, and pneumatic valve based on configuration information stored in a memory of the programmable logic controller, the pulse train generated responsive to an output polarity of the pulse train provided by a user via the wizard; and a control panel for controlling, monitoring and testing motion operations.

14. A system for configuring a programmable logic controller, comprising:

means for initiating a wizard at a computer when the computer is not communicatively coupled to the programmable logic controller, the wizard adapted for:

determining when the programmable logic controller is communicatively coupled to the computer;

retrieving parameter data from the programmable logic controller in response to determining that the programmable logic controller is communicatively coupled to the computer;

automatically range checking the parameter data;

pre-loading, through the wizard, one or more options for a configuration of a position module based on position parameter data retrieved from the programmable logic controller;

querying for a plurality of answers regarding an application of the programmable logic controller; and based on the position parameter data retrieve, the pre-loaded one or more options, and the answers, generating at least one configuration adapted to configure the position module and at least one set of instructions executed by the programmable logic controller, the position module distinct from, and communicatively connected to, the programmable logic controller, the position module adapted to generate a pulse train, the pulse train adapted to control motion of at least one of a stepper drive, servo drive, stepper motor, servomotor, linear motor, motor, ball screw, servo valve, hydraulic actuator, and pneumatic valve based on the at least one configuration, the pulse train generated responsive to an output polarity of the pulse train provided by a user via the wizard.

15. The method of claim 1, further comprising compiling, encrypting, and downloading a program comprising the at least one configuration to the programmable logic controller.

16. The method of claim 1, wherein the position module is a function module adapted for generating pulse trains used for controlling speed and position of at least one of the stepper drive, servo drive, stepper motor, servomotor, linear motor, motor, ball screw, servo valve, hydraulic actuator and pneumatic value.

17. The method of claim 16, wherein at least one of the stepper drive, servo drive, stepper motor, servomotor, linear motor, motor, ball screw, servo valve, hydraulic actuator and pneumatic value is positioned responsive to a Jog command provided by the user.

18. The method of claim 17, wherein the pulse train is adapted to control motion of an actuator controller.

19. The method of claim 16, wherein the pulse train is generated to provide jerk compensation responsive to a value specified via the wizard.

20. The method of claim 19, wherein the pulse train is adapted to control motion of at least one of a stepper drive and a servo drive.

21. The method of claim 16, wherein the pulse train is adapted to control motion of an actuator.

22. The method of claim 21, wherein the actuator is one of a stepper drive, servo drive, stepper motor, servomotor, linear motor, motor, ball screw, servo valve, hydraulic actuator and pneumatic value.

23. The method of claim 1, wherein the position module generates pulse trains for controlling motion based on configuration information stored in a memory of the programmable logic controller, the pulse trains comprising a backlash compensation responsive to a value specified via the wizard.

24. The method of claim 1, further comprising editing an existing configuration.

25. The method of claim 1, further comprising receiving a default configuration if creating a new configuration.

26. The method of claim 12, further comprising accessing an online help web site to provide an additional explanation for at least one of the plurality of parameters.

27. The method of claim 12, further comprising generating the at least one configuration comprising at least one parameter, the wizard adapted to verify that the position module is wired correctly, adjust data of the at least one configuration and to test each motion profile.

28. The method of claim 27, wherein the configuration further comprises program instructions and functions blocks based on the configuration.

29. The method of claim 28, wherein the program instructions are custom generated and adapted to implement special requirements.

30. The method of claim 12, further comprising connecting the configuration to the position module by placing calls to instructions generated by the wizard.

31. The method of claim 12, further comprising downloading the configuration to the position module and to the programmable logic controller.

32. A system for configuring a position module, comprising:

an interface device adapted to communicatively couple a programmable logic controller to a processor; and a wizard adapted for:

determining when a programmable logic controller is communicatively coupled to a computer;

retrieving parameter data from the programmable logic controller in response to determining that the programmable logic controller is communicatively coupled to the computer;

pre-loading, through the wizard, one or more options for a configuration of the position module based on position parameter data retrieved from the programmable logic controller;

querying a user of the processor for answers to questions regarding a programmable logic controller application;

receiving answers to the questions;

based on the position parameter data retrieved, the pre-loaded one or more options, and the answers, generating a parameter configuration adapted to configure the position module and a set of machine executable instructions adapted for use in a program that drives the programmable logic controller application, the position module distinct from, and communicatively connected to the programmable logic controller, the position module adapted to generate a pulse train, the pulse train adapted to control motion of least one of the stepper drive, servo drive, stepper motor, servomotor, linear motor, motor, ball screw, servo valve, hydraulic actuator and pneumatic value based on at least one configuration, the pulse train generated responsive to an output polarity of the pulse train provided by the user via the wizard; and automatically range checking module parameters of the parameter configuration.

33. A machine-readable medium storing machine instructions for activities comprising:
initiating a wizard at a computer when the computer is not communicatively coupled to the programmable logic controller, the wizard adapted for:
   determining when a programmable logic controller is communicatively coupled to the computer;
   retrieving parameter data from the programmable logic controller in response to determining that the programmable logic controller is communicatively coupled to the computer;
   automatically range checking the parameter data;
   pre-loading, through the wizard, one or more options for a configuration of a position module based on position parameter data retrieved from the programmable logic controller;
   querying for a plurality of motion answers;
   generating at least one position module configuration based on the position parameter data retrieved, the pre-loaded one or more options, and the motion answers, the position module distinct from, and communicatively connected to, the programmable logic controller, the position module adapted to generate a pulse train, the pulse train adapted to control motion of least one of the stepper drive, servo drive, stepper motor, servomotor, linear motor, motor, ball screw, servo valve, hydraulic actuator and pneumatic value based on the at least one configuration, the pulse train generated responsive to an output polarity of the pulse train provided by the a user via the wizard; and
storing the at least one position module configuration in a predetermined storage location of a memory of the programmable logic controller, the predetermined storage location selected to avoid conflicts with a user program executable via the programmable logic controller.

* * * * *